(12) United States Patent
Zhou et al.

(10) Patent No.: US 11,595,667 B2
(45) Date of Patent: Feb. 28, 2023

(54) CONSTRAINTS ON LOCATIONS OF REFERENCE BLOCKS FOR INTRA BLOCK COPY PREDICTION

(71) Applicant: Microsoft Technology Licensing, LLC, Redmond, WA (US)

(72) Inventors: You Zhou, Sammamish, WA (US); Chih-Lung Lin, Redmond, WA (US); Ming-Chieh Lee, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/198,421

(22) Filed: Mar. 11, 2021

(65) Prior Publication Data

US 2021/0203957 A1    Jul. 1, 2021

Related U.S. Application Data

(62) Division of application No. 15/866,291, filed on Jan. 9, 2018, now Pat. No. 10,986,349.

(60) Provisional application No. 62/612,293, filed on Dec. 29, 2017.

(51) Int. Cl.
| | | |
|---|---|---|
| H04N 19/176 | (2014.01) | |
| H04N 19/105 | (2014.01) | |
| H04N 19/593 | (2014.01) | |
| H04N 19/103 | (2014.01) | |
| H04N 19/139 | (2014.01) | |

(52) U.S. Cl.
CPC ......... *H04N 19/176* (2014.11); *H04N 19/103* (2014.11); *H04N 19/105* (2014.11); *H04N 19/139* (2014.11); *H04N 19/593* (2014.11)

(58) Field of Classification Search
None
See application file for complete search history.

(56) References Cited

U.S. PATENT DOCUMENTS

2016/0330474 A1* 11/2016 Liu ................... H04N 19/523
2016/0360210 A1* 12/2016 Xiu ................... H04N 19/186

FOREIGN PATENT DOCUMENTS

WO    WO-2015054811 A  *  4/2015  ............... G06T 9/00

* cited by examiner

*Primary Examiner* — James M Anderson, II
(74) *Attorney, Agent, or Firm* — Klarquist Sparkman, LLP

(57) ABSTRACT

When encoding/decoding a current block of a current picture using intra block copy ("BC") prediction, the location of a reference block is constrained so that it can be entirely within an inner search area of the current picture or entirely within an outer search area of the current picture, but cannot overlap both the inner search area and the outer search area. In some hardware-based implementations, on-chip memory buffers sample values of the inner search area, and off-chip memory buffers sample values of the outer search area. By enforcing this constraint on the location of the reference block, an encoder/decoder can avoid memory access operations that are split between on-chip memory and off-chip memory when retrieving the sample values of the reference block. At the same time, a reference block close to the current block may be used for intra BC prediction, helping compression efficiency.

20 Claims, 14 Drawing Sheets software 180 implementing one or more innovations for encoding/decoding with constraints on locations of reference blocks for intra BC prediction mode

400

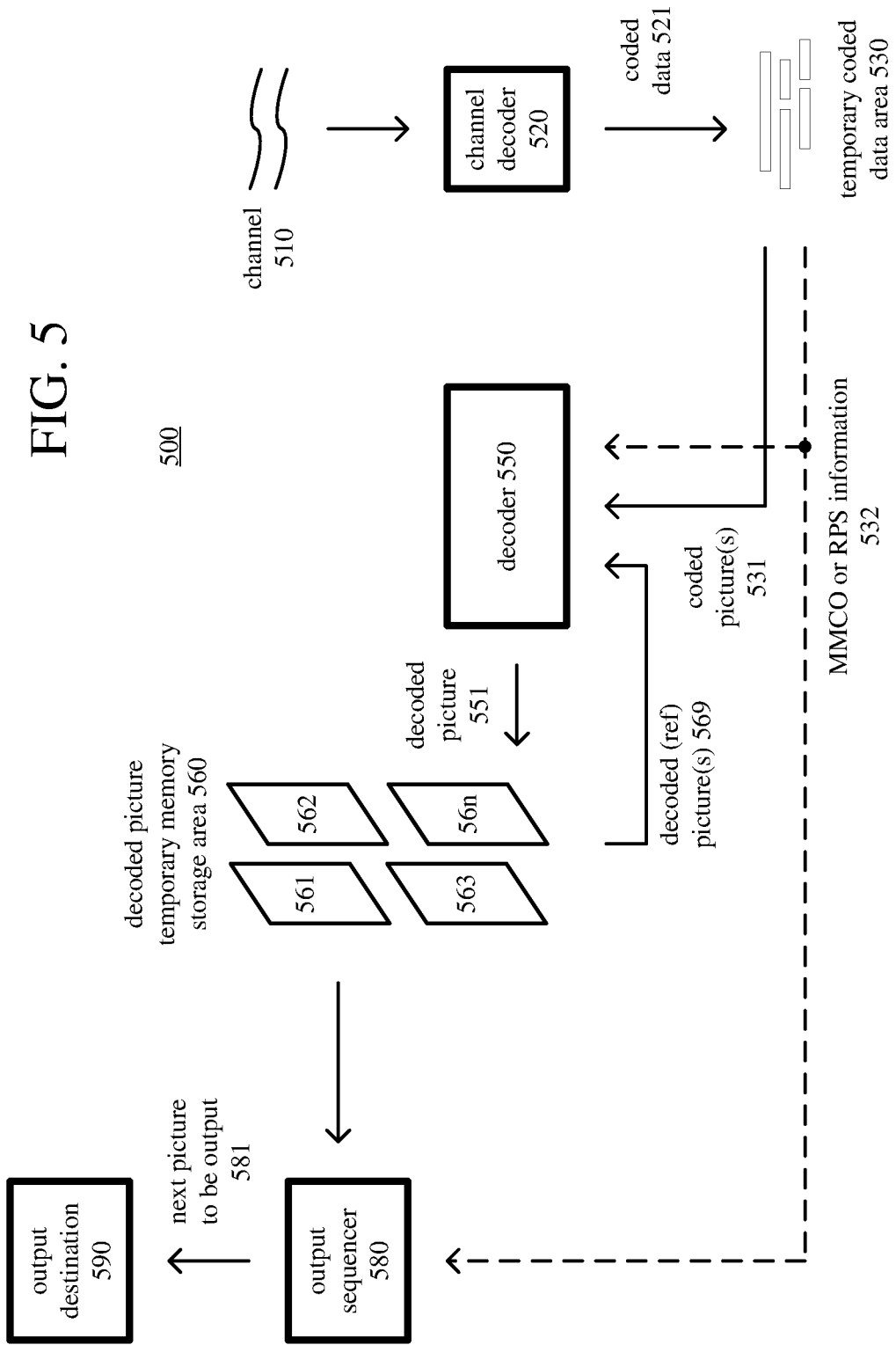

600 (example of decoder 550)

BV value (740) for current block (730) of current picture (710), indicating a displacement to a reference block (750) in the current picture (710)

BV values (841, 842, 843, 844) indicating displacements to candidate reference blocks for current block (830) of current picture (810)

1100 z-scan order for
current unit 1130
and earlier units in
root SB 1110

CONSTRAINTS ON LOCATIONS OF REFERENCE BLOCKS FOR INTRA BLOCK COPY PREDICTION

CROSS REFERENCE TO RELATED APPLICATIONS

This application is a divisional of U.S. patent application Ser. No. 15/866,291, filed Jan. 9, 2018, the disclosure of which is hereby incorporated by reference, which claims the benefit of U.S. Provisional Patent Application No. 62/612,293, filed Dec. 29, 2017, the disclosure of which is hereby incorporated by reference.

BACKGROUND

Engineers use compression (also called source coding or source encoding) to reduce the bit rate of digital video. Compression decreases the cost of storing and transmitting video information by converting the information into a lower bit rate form. Decompression (also called decoding) reconstructs a version of the original information from the compressed form. A "codec" is an encoder/decoder system.

Over the last 30 years, various video codec standards have been adopted, including the ITU-T H.261, H.262 (MPEG-2 or ISO/IEC 13818-2), H.263, H.264 (MPEG-4 AVC or ISO/IEC 14496-10), and H.265 (HEVC or ISO/IEC 23008-2) standards, the MPEG-1 (ISO/IEC 11172-2) and MPEG-4 Visual (ISO/IEC 14496-2) standards, and the SMPTE 421M (VC-1) standard. More recently, various extensions to the H.265 standard (e.g., for scalable video coding/decoding, for coding/decoding of video with higher fidelity in terms of sample bit depth or chroma sampling rate, for screen content) have also been adopted. A video codec standard typically defines options for the syntax of an encoded video bitstream, detailing parameters in the bitstream when particular features are used in encoding and decoding. In many cases, a video codec standard also provides details about the decoding operations a decoder should perform to achieve conforming results in decoding. Aside from codec standards, various codec formats such as VP8, VP9, and AV1 (currently under development) define other options for the syntax of an encoded video bitstream and corresponding decoding operations.

Intra block copy ("BC") is a prediction mode in the H.265 standard. An intra BC prediction mode is also under consideration for the AV1 format. For intra BC prediction, the sample values of a current block of a picture are predicted using previously reconstructed sample values of a reference block in the same picture. A block vector ("BV") value indicates a displacement from the current block to the reference block in the same picture. The BV value can be signaled in the bitstream. In particular, intra BC prediction can be effective for encoding screen content.

In intra BC prediction mode for the H.265 standard, a reference block is allowed to be anywhere in previously reconstructed content in the same picture, even right next to the current block. This can make intra BC prediction mode very effective in terms of lowering bit rate and improving quality, since a nearby reference block may closely match the current block. In hardware implementations of intra BC prediction mode for the H.265 standard, however, memory access operations for a reference block can be slow and inefficient. A hardware-based encoder or hardware-based decoder typically stores sample values in fast "on-chip" memory (such as a fast cache) during reconstruction of those sample values, when the sample values are accessed frequently. Because size of the on-chip memory is limited, the hardware-based encoder/decoder eventually transfers a batch of reconstructed sample values to slower "off-chip" memory (such as dynamic random access memory). In the off-chip memory, the reconstructed sample values may still be accessed for intra BC prediction mode or other prediction, but memory access operations are slower. In particular, in hardware implementations of intra BC prediction mode for the H.265 standard, memory access operations can be slow and inefficient when one part of a reference block (close to the current block) is stored in on-chip memory but the rest of the reference block (further from the current block) is separately stored in off-chip memory.

In contrast, in some current implementations of intra BC prediction mode for the AV1 format, a reference block is constrained to be outside a "superblock" that includes the current unit being encoded/decoded with intra BC prediction, or the reference block is constrained to be outside the superblock that includes the current unit and also outside the previous superblock. With such a constraint on locations of reference blocks, intra BC prediction is more "hardware friendly"—slow, inefficient memory access operations can be avoided in hardware implementations—but intra BC prediction may be less effective in terms of lowering bit rate and improving quality.

SUMMARY

In summary, the detailed description presents innovations in intra block copy ("BC") prediction. For example, when encoding/decoding a current block of a current picture using intra BC prediction, the location of a reference block for the intra BC prediction is constrained so that the reference block can be entirely within an inner search area of the current picture or entirely within an outer search area of the current picture, but the reference block cannot overlap both the inner search area and the outer search area. In some example implementations, on-chip memory buffers sample values of the inner search area, and off-chip memory buffers sample values of the outer search area. By enforcing this constraint on the location of the reference block, an encoder/decoder can avoid memory access operations that are split between on-chip memory and off-chip memory when retrieving the sample values of the reference block. At the same time, a reference block close to the current block (within the inner search area) may be used for intra BC prediction, which can improve the effectiveness of intra BC prediction in terms of lowering bit rate and improving quality.

According to one aspect of the innovations described herein, a video encoder or image encoder encodes a current picture to produce encoded data and outputs the encoded data as part of a bitstream. During the encoding, for a current unit of the current picture, the encoder determines a block vector ("BV") value associated with the current unit and performs intra BC prediction for a given block of the current unit using the BV value associated with the current unit. The BV value indicates a displacement from the given block of the current unit to a reference block in the current picture. When it determines the BV value, the encoder enforces a constraint that (a) allows the reference block to be entirely within an inner search area of the current picture and (b) allows the reference block to be entirely within an outer search area of the current picture but (c) prohibits the reference block from overlapping both the inner search area and the outer search area. That is, the reference block can be located entirely within the outer search area, or the reference block can be located entirely within the inner search area.

The reference block cannot, however, be partially located in the inner search area and partially located in the outer search area. For example, the inner search area is a root superblock that includes the current unit, and the outer search area is other previously encoded/reconstructed parts of the current picture. In some example implementations, a first buffer in on-chip memory stores sample values of the inner search area, and a second buffer in off-chip memory stores sample values of the outer search area.

A boundary line or boundary region can separate the inner search area from the outer search area. To enforce the constraint, the encoder can check that the reference block does not cross the boundary line or boundary region. Or, to enforce the constraint, the encoder can check that the reference block is completely contained within the inner search area or completely contained within the outer search area.

According to another aspect of the innovations described herein, a video decoder or image decoder receives encoded data as part of a bitstream and decodes a current picture using the encoded data. The encoded data satisfies bitstream conformance requirements. During the decoding, for a current unit of the current picture, the decoder reconstructs a BV value associated with the current unit and performs intra BC prediction for a given block of the current unit using the BV value associated with the current unit. The BV value indicates a displacement from the given block of the current unit to a reference block in the current picture. According to one of the bitstream conformance requirements, the BV value is constrained so that (a) the reference block is allowed to be entirely within an inner search area of the current picture and (b) the reference block is allowed to be entirely within an outer search area of the current picture but (c) the reference block is prohibited from overlapping both the inner search area and the outer search area. That is, the reference block can be located entirely within the outer search area, or the reference block can be located entirely within the inner search area. The reference block cannot, however, be partially located in the inner search area and partially located in the outer search area.

The innovations can be implemented as part of a method, as part of a computing system configured to perform the method or as part of a tangible computer-readable media storing computer-executable instructions for causing a computing system to perform the method. The various innovations can be used in combination or separately. This summary is provided to introduce a selection of concepts in a simplified form that are further described below in the detailed description. This summary is not intended to identify key features or essential features of the claimed subject matter, nor is it intended to be used to limit the scope of the claimed subject matter. The foregoing and other objects, features, and advantages of the invention will become more apparent from the following detailed description, which proceeds with reference to the accompanying figures.

BRIEF DESCRIPTION OF THE DRAWINGS

FIG. 5 is a diagram of an example decoder system, and

DETAILED DESCRIPTION

Figure 1:
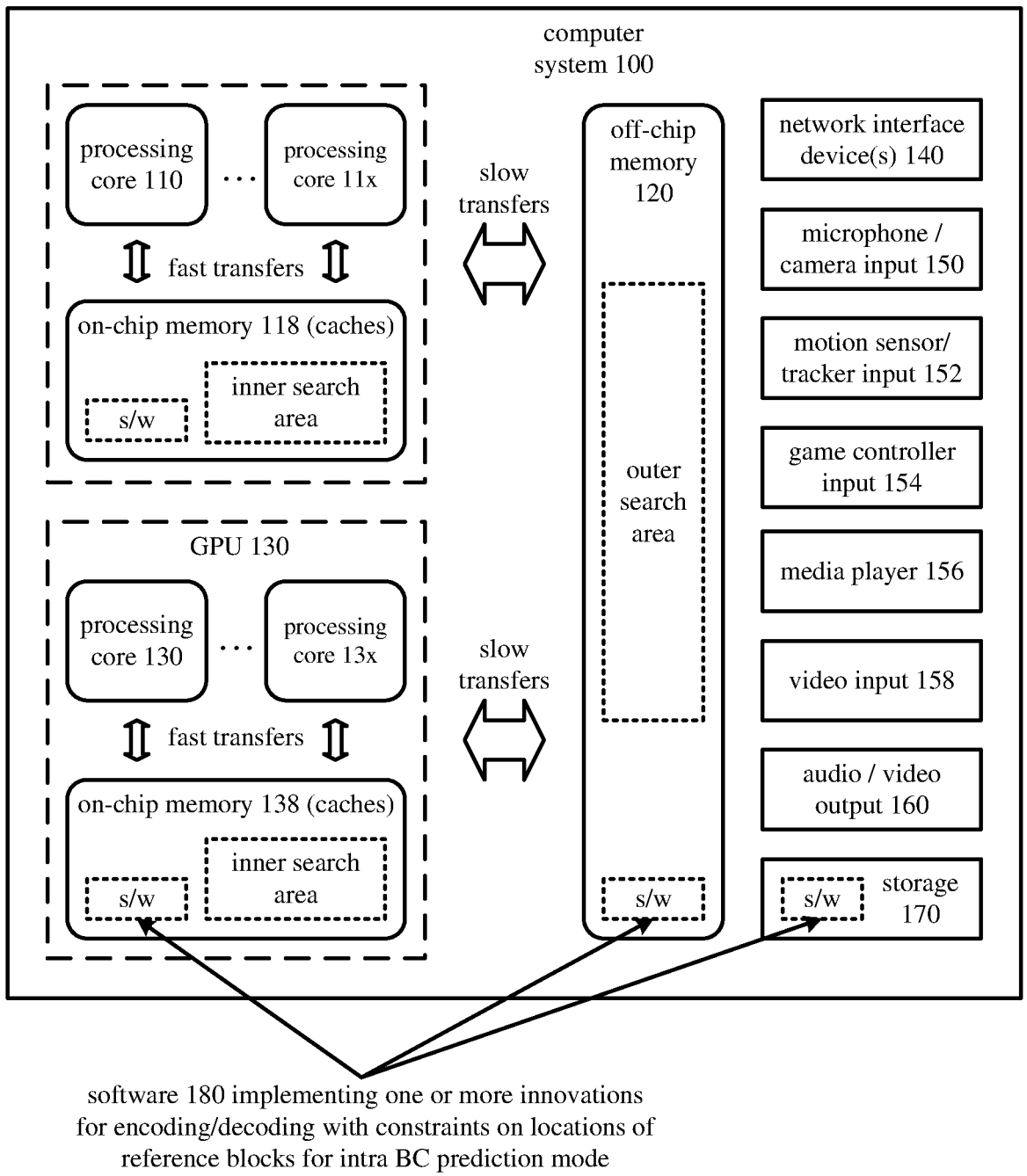
FIG. 1 is a diagram of an example computer system in which some described embodiments can be implemented.

The detailed description presents innovations in intra block copy ("BC") prediction. In particular, when encoding/decoding a current block of a current picture using intra BC prediction, the location of a reference block for the intra BC prediction is constrained. For example, the reference block is constrained to be entirely within an inner search area of the current picture or entirely within an outer search area of the current picture, but the reference block cannot overlap both the inner search area and the outer search area. By enforcing this constraint on the location of the reference block, a hardware encoder/decoder can avoid memory access operations that are split between on-chip memory (buffering sample values of the inner search area) and off-chip memory (buffering sample values of the outer search area), while still permitting the reference block to be close to the current block (within the inner search area).

Although operations described herein are in places described as being performed by a video encoder or video decoder, in many cases the operations can be performed by another type of media processing tool (e.g., image encoder or image decoder).

Some of the innovations described herein are illustrated with reference to terms specific to extensions of the AV1 format. The innovations described herein can also be implemented for other codec formats. For example, some of the innovations described herein can be implemented in extensions of the H.265 standard.

Many of the innovations described herein are adapted for encoding or decoding of certain "artificially-created" video content such as screen content. In general, screen content (also called screen capture video) is video that contains rendered text, computer graphics, animation-generated content or other similar types of content captured when rendered to a computer display, as opposed to camera-captured video content only. Screen content typically includes repeated structures (e.g., graphics, text characters). Also, screen content typically includes a small number of different colors, compared to "natural" video captured with a camera. Drastic changes from pixel-to-pixel and sharp edges are also common in screen content, compared to natural video. Screen content is often encoded in a format (e.g., YUV 4:4:4 or RGB 4:4:4) with high chroma sampling resolution, although it may instead be encoded in a format with lower chroma sampling resolution (e.g., YUV 4:2:0). Common scenarios for encoding/decoding of screen content include remote desktop conferencing and encoding/decoding of graphical overlays on natural video or other "mixed content" video. Several of the innovations described herein are adapted for encoding/decoding of screen content or other artificially-created video. These innovations can also be used for natural video, but may not be as effective.

Many of the examples described herein involve intra BC prediction for blocks of luma sample values (luma blocks) and corresponding blocks of chroma sample values (chroma blocks) for a picture in a YUV 4:4:4 format, YUV 4:2:2, format or YUV 4:2:0 format. Chroma sample values may be sub-sampled to a lower chroma sampling rate (e.g., for YUV 4:2:0 format or YUV 4:2:2 format), or the chroma sample values may have the same resolution as the luma sample values (e.g., for YUV 4:4:4 format). Alternatively, video can be organized according to another format (e.g., RGB 4:4:4 format, GBR 4:4:4 format or BGR 4:4:4 format). In general, a primary component block is a block of sample values for a primary component (such as Y for a YUV format, or R for an RGB format), and a secondary component block is a block of sample values for a secondary component (such as U or V for a YUV format, or G or B for an RGB format).

More generally, various alternatives to the examples described herein are possible. For example, some of the methods described herein can be altered by changing the ordering of the method acts described, by splitting, repeating, or omitting certain method acts, etc. The various aspects of the disclosed technology can be used in combination or separately. Different embodiments use one or more of the described innovations. Some of the innovations described herein address one or more of the problems noted in the background. Typically, a given technique/tool does not solve all such problems.

I. Example Computer Systems.

FIG. 1 illustrates a generalized example of a suitable computer system (100) in which several of the described innovations may be implemented. The innovations described herein relate to intra BC prediction, which in general involves prediction of the sample values of a current block of a picture using previously reconstructed sample values of a reference block in the same picture. Aside from its use in intra BC prediction, the computer system (100) is not intended to suggest any limitation as to scope of use or functionality, as the innovations may be implemented in diverse computer systems, including special-purpose computer systems adapted for video/image encoding and/or decoding.

With reference to FIG. 1, the computer system (100) includes one or more processing cores (110 . . . 11x) and local memory (118) of system-on-a-chip ("SoC"), application-specific integrated circuit ("ASIC") or other integrated circuit. The processing core(s) (110 . . . 11x) are, for example, processing cores on a single chip, and execute computer-executable instructions. The number of processing core(s) (110 . . . 11x) depends on implementation and can be, for example, 4 or 8. The local memory (118) may be volatile memory (e.g., registers, cache, RAM), non-volatile memory (e.g., ROM, EEPROM, flash memory, etc.), or some combination of the two, accessible by the respective processing core(s) (110 . . . 11x).

The local memory (118) can store software (180) implementing one or more innovations for encoding/decoding with constraints on locations of reference blocks for intra BC prediction, for operations performed by the respective processing core(s) (110 . . . 11x), in the form of computer-executable instructions. In FIG. 1, the local memory (118) is on-chip memory such as one or more caches, for which access operations, transfer operations, etc. with the processing core(s) (110 . . . 11x) are fast. The local memory (118) can include at least one buffer that stores reconstructed sample values of an inner search area of a picture. The location of a reference block can be constrained so that the reference block is permitted to be entirely within the inner search area but is not permitted to be only partially overlapping the inner search area.

The computer system (100) also includes processing cores (130 . . . 13x) and local memory (138) of a graphics processing unit ("GPU"). The number of processing cores (130 . . . 13x) of the GPU depends on implementation. The processing cores (130 . . . 13x) are, for example, part of single-instruction, multiple data ("SIMD") units of the GPU. The SIMD width n, which depends on implementation, indicates the number of elements (sometimes called lanes) of a SIMD unit. For example, the number of elements (lanes) of a SIMD unit can be 16, 32, 64, or 128 for an extra-wide SIMD architecture. The local memory (138) may be volatile memory (e.g., registers, cache, RAM), non-volatile memory (e.g., ROM, EEPROM, flash memory, etc.), or some combination of the two, accessible by the respective processing cores (130 . . . 13x).

The local memory (138) can store software (180) implementing one or more innovations for encoding/decoding with constraints on locations of reference blocks for intra BC prediction, for operations performed by the respective processing cores (130 . . . 13x), in the form of computer-executable instructions such as shader code. In FIG. 1, the local memory (138) is on-chip memory such as one or more caches, for which access operations, transfer operations, etc. with the processing cores (130 . . . 13x) are fast. The local memory (138) can include at least one buffer that stores reconstructed sample values of an inner search area of a picture. The location of a reference block can be constrained so that the reference block is permitted to be entirely within the inner search area but is not permitted to be only partially overlapping the inner search area.

The computer system (100) includes shared memory (120), which may be volatile memory (e.g., RAM), non-volatile memory (e.g., ROM, EEPROM, flash memory, etc.), or some combination of the two, accessible by the processing core(s) (110 . . . 11x, 130 . . . 13x). The memory (120) stores software (180) implementing one or more innovations for encoding/decoding with constraints on locations of reference blocks for intra BC prediction, in the form of computer-executable instructions. In FIG. 1, the shared memory (120) is off-chip memory, for which access operations, transfer operations, etc. with the processing cores (110 . . . 11x, 130 . . . 13x) are slower. The shared memory (120) can include at least one buffer that stores reconstructed sample values of an outer search area of a picture. The location of a reference block can be constrained so that the reference block is permitted to be entirely within the outer search area but is not permitted to be only partially overlapping the outer search area.

Alternatively, the computer system (100) includes one or more processing cores of a central processing unit ("CPU") and associated memory. The processing core(s) of the CPU can execute computer-executable instructions for one or more innovations for encoding/decoding with constraints on locations of reference blocks for intra BC prediction.

The computer system (100) includes one or more network interface devices (140). The network interface device(s)

(140) enable communication over a network to another computing entity (e.g., server, other computer system). The network interface device(s) (140) can support wired connections and/or wireless connections, for a wide-area network, local-area network, personal-area network or other network. For example, the network interface device(s) can include one or more Wi-Fi transceivers, an Ethernet port, a cellular transceiver and/or another type of network interface device, along with associated drivers, software, etc. The network interface device(s) (140) convey information such as computer-executable instructions, audio or video input or output, or other data in a modulated data signal over network connection(s). A modulated data signal is a signal that has one or more of its characteristics set or changed in such a manner as to encode information in the signal. By way of example, and not limitation, the network connections can use an electrical, optical, RF, or other carrier.

A camera input (150) accepts video input in analog or digital form from a video camera, which captures natural video. An audio input accepts audio input in analog or digital form from a microphone (150), which captures audio.

The computer system (100) optionally includes a motion sensor/tracker input (152) for a motion sensor/tracker, which can track the movements of a user and objects around the user. For example, the motion sensor/tracker allows a user (e.g., player of a game) to interact with the computer system (100) through a natural user interface using gestures and spoken commands. The motion sensor/tracker can incorporate gesture recognition, facial recognition and/or voice recognition.

A game controller input (154) accepts control signals from one or more game controllers, over a wired connection or wireless connection. The control signals can indicate user inputs from one or more directional pads, buttons, triggers and/or one or more joysticks of a game controller. The control signals can also indicate user inputs from a touchpad or touchscreen, gyroscope, accelerometer, angular rate sensor, magnetometer and/or other control or meter of a game controller.

The computer system (100) optionally includes a media player (156) and video input (158). The media player (156) can play DVDs, Blu-ray disks, other disk media and/or other formats of media. The video input (158) can accept input video in analog or digital form (e.g., from a cable input, HDMI input or other input).

A video output (160) provides video output to a display device. The video output (160) can be an HDMI output or other type of output. An audio output (160) provides audio output to one or more speakers.

The storage (170) may be removable or non-removable, and includes magnetic media (such as magnetic disks, magnetic tapes or cassettes), optical disk media and/or any other media which can be used to store information and which can be accessed within the computer system (100). The storage (170) stores instructions for the software (180) implementing one or more innovations for encoding/decoding with constraints on locations of reference blocks for intra BC prediction.

The computer system (100) may have additional features. For example, the computer system (100) includes one or more other input devices and/or one or more other output devices. The other input device(s) may be a touch input device such as a keyboard, mouse, pen, or trackball, a scanning device, or another device that provides input to the computer system (100). The other output device(s) may be a printer, CD-writer, or another device that provides output from the computer system (100).

An interconnection mechanism (not shown) such as a bus, controller, or network interconnects the components of the computer system (100). Typically, operating system software (not shown) provides an operating environment for other software executing in the computer system (100), and coordinates activities of the components of the computer system (100).

The innovations can be described in the general context of computer-readable media. Computer-readable media are any available tangible media that can be accessed within a computing environment. By way of example, and not limitation, with the computer system (100), computer-readable media include memory (118, 120, 138), storage (170), and combinations thereof. The term computer-readable media does not encompass transitory propagating signals or carrier waves.

The innovations can be described in the general context of computer-executable instructions being executed in a computer system on a target real or virtual processor. The computer-executable instructions can include instructions executable on processing cores of a general-purpose processor to provide functionality described herein, instructions (e.g., for a host, driver, or wrapper layer) executable to control a GPU or special-purpose hardware (e.g., SoC, ASIC) to provide functionality described herein, instructions executable on processing cores of a GPU to provide functionality described herein, and/or instructions executable on processing cores of a special-purpose processor (e.g., SoC, ASIC) to provide functionality described herein. In some implementations, computer-executable instructions can be organized in program modules. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computer system or device. In general, a computer system or device can be local or distributed, and can include any combination of special-purpose hardware and/or hardware with software implementing the functionality described herein.

For the sake of presentation, the detailed description uses terms like "determine," "receive" and "provide" to describe computer operations in a computing system. These terms denote operations performed by a computer and should not be confused with acts performed by a human being. The actual computer operations corresponding to these terms vary depending on implementation.

II. Example Network Environments.

Figure 2A:
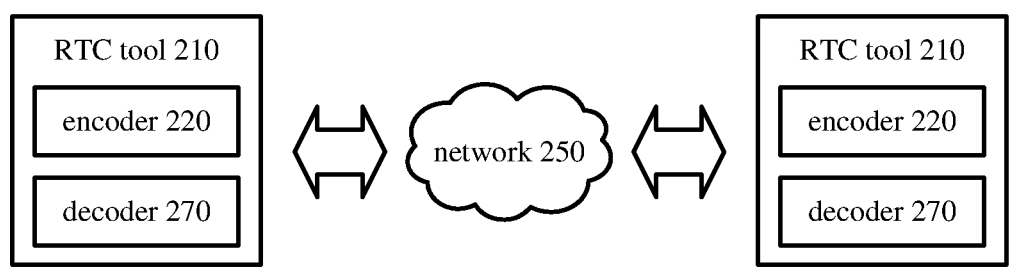
FIGS. 2a and 2b are diagrams of example network environments in which some described embodiments can be implemented.
Figure 2B:
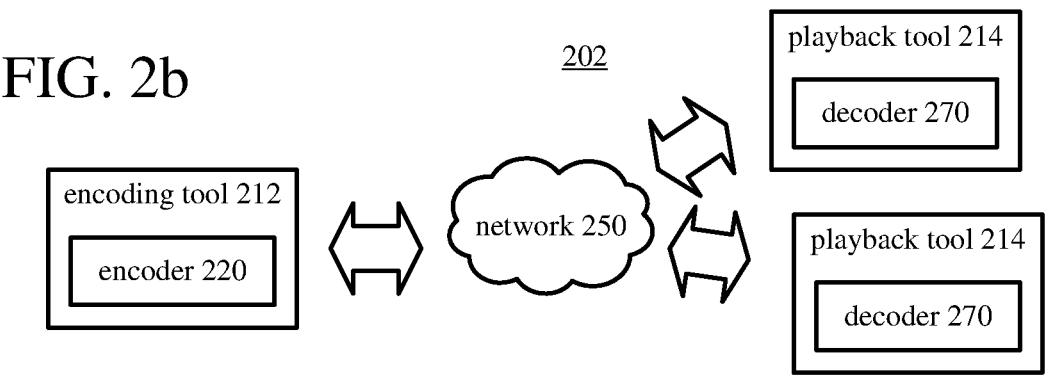

FIGS. 2a and 2b show example network environments (201, 202) that include video encoders (220) and video decoders (270). The encoders (220) and decoders (270) are connected over a network (250) using an appropriate communication protocol. The network (250) can include the Internet or another computer network.

In the network environment (201) shown in FIG. 2a, each real-time communication ("RTC") tool (210) includes both an encoder (220) and a decoder (270) for bidirectional communication. A given encoder (220) can produce output compliant with an extension of the AV1 format, VP8 format, VP9 format, H.265 format, or another codec format, with a corresponding decoder (270) accepting encoded data from the encoder (220). The bidirectional communication can be part of a video conference, video telephone call, or other two-party or multi-party communication scenario. Although the network environment (201) in FIG. 2a includes two real-time communication tools (210), the network environment (201) can instead include three or more real-time communication tools (210) that participate in multi-party communication.

Figure 3:
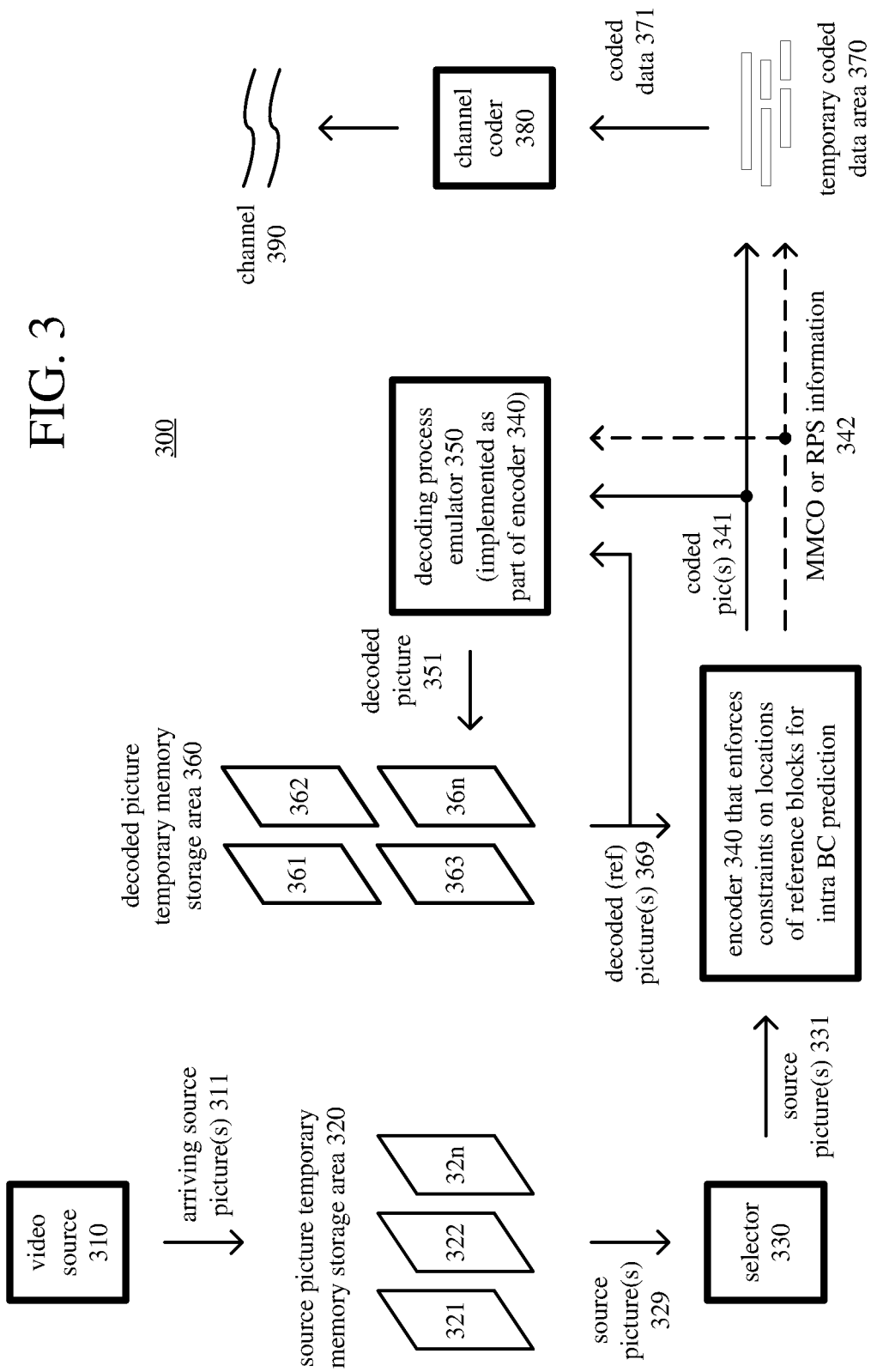
FIG. 3 is a diagram of an example encoder system.

A real-time communication tool (210) manages encoding by an encoder (220). FIG. 3 shows an example encoder system (300) that can be included in the real-time communication tool (210). Alternatively, the real-time communication tool (210) uses another encoder system. A real-time communication tool (210) also manages decoding by a decoder (270). FIG. 5 shows an example decoder system (500), which can be included in the real-time communication tool (210). Alternatively, the real-time communication tool (210) uses another decoder system.

In the network environment (202) shown in FIG. 2b, an encoding tool (212) includes an encoder (220) that encodes video for delivery to multiple playback tools (214), which include decoders (270). The unidirectional communication can be provided for a video surveillance system, web camera monitoring system, remote desktop conferencing presentation or other scenario in which video is encoded and sent from one location to one or more other locations. Although the network environment (202) in FIG. 2b includes two playback tools (214), the network environment (202) can include more or fewer playback tools (214). In general, a playback tool (214) communicates with the encoding tool (212) to determine a stream of video for the playback tool (214) to receive. The playback tool (214) receives the stream, buffers the received encoded data for an appropriate period, and begins decoding and playback.

FIG. 3 shows an example encoder system (300) that can be included in the encoding tool (212). Alternatively, the encoding tool (212) uses another encoder system. The encoding tool (212) can also include server-side controller logic for managing connections with one or more playback tools (214). FIG. 5 shows an example decoder system (500), which can be included in the playback tool (214). Alternatively, the playback tool (214) uses another decoder system. A playback tool (214) can also include client-side controller logic for managing connections with the encoding tool (212).

III. Example Encoder Systems and Video Encoders.

FIG. 3 is a block diagram of an example encoder system (300) in conjunction with which some described embodiments may be implemented. The encoder system (300) can be a general-purpose encoding tool capable of operating in any of multiple encoding modes such as a low-latency encoding mode for real-time communication, a transcoding mode, and a higher-latency encoding mode for producing media for playback from a file or stream, or it can be a special-purpose encoding tool adapted for one such encoding mode. The encoder system (300) can be adapted for encoding of a particular type of content (e.g., screen content). The encoder system (300) can be implemented as part of an operating system module, as part of an application library, as part of a standalone application, using GPU hardware, or using special-purpose hardware. Overall, the encoder system (300) receives a sequence of source video pictures (311) from a video source (310) and produces encoded data as output to a channel (390). The encoded data output to the channel (390) can include content encoded using intra BC prediction with constraints on locations of reference blocks as described herein.

The video source (310) can be a camera, tuner card, storage media, screen capture module, or other digital video source. The video source (310) produces a sequence of video pictures at a frame rate of, for example, 30 frames per second. As used herein, the term "picture" generally refers to source, coded or reconstructed image data. For progressive-scan video, a picture is a progressive-scan video frame. For interlaced video, in example embodiments, an interlaced video frame might be de-interlaced prior to encoding. Alternatively, two complementary interlaced video fields are encoded together as a single video frame or encoded as two separately-encoded fields. Aside from indicating a progressive-scan video frame or interlaced-scan video frame, the term "picture" can indicate a single non-paired video field, a complementary pair of video fields, a video object plane that represents a video object at a given time, or a region of interest in a larger image. The video object plane or region can be part of a larger image that includes multiple objects or regions of a scene.

An arriving source picture (311) is stored in a source picture temporary memory storage area (320) that includes multiple picture buffer storage areas (321, 322, . . . , 32n). A picture buffer (321, 322, etc.) holds one source picture in the source picture storage area (320). After one or more of the source pictures (311) have been stored in picture buffers (321, 322, etc.), a picture selector (330) selects an individual source picture from the source picture storage area (320). The order in which pictures are selected by the picture selector (330) for input to the encoder (340) may differ from the order in which the pictures are produced by the video source (310), e.g., the encoding of some pictures may be delayed in order, so as to allow some later pictures to be encoded first and to thus facilitate temporally backward prediction. Before the encoder (340), the encoder system (300) can include a pre-processor (not shown) that performs pre-processing of the selected picture (331) before encoding. The pre-processing can include color space conversion into primary (e.g., luma) and secondary (e.g., chroma differences toward red and toward blue) color components and resampling processing (e.g., to reduce the spatial resolution of chroma components) for encoding.

Before encoding, video may be converted to a color space such as YUV. A YUV format includes a luma (or Y) component with sample values representing approximate brightness values as well as multiple chroma (or U and V) components with sample values representing color-difference values. The precise definitions of the color-difference values (and conversion operations to/from YUV color space to another color space such as RGB) depend on implementation. In general, as used herein, the term YUV indicates any color space with a luma (or luminance) component and one or more chroma (or chrominance) components, including Y'UV, YIQ, Y'IQ and YDbDr as well as variations such as YCbCr and YCoCg.

Chroma sample values may be sub-sampled to a lower chroma sampling rate, or chroma sample values may have the same resolution as luma sample values. In a YUV 4:4:4 format, chroma information is represented at the same spatial resolution as luma information. Many commercially available video encoders and decoders support a YUV 4:2:0 chroma sampling format or YUV 4:2:2 chroma sampling format. A YUV 4:2:0 format is a format that sub-samples chroma information compared to a YUV 4:4:4 format, so that chroma resolution is half that of luma resolution both horizontally and vertically. As a design principle, the decision to use a YUV 4:2:0 format for encoding/decoding is premised on the understanding that, for typical use cases such as encoding/decoding of natural, camera-captured video content, viewers do not ordinarily notice significant visual differences between video encoded/decoded in a YUV 4:2:0 format and video encoded/decoded in a YUV 4:4:4 format. The compression advantages for the YUV 4:2:0 format, which has fewer samples per picture, are therefore compelling. A YUV 4:2:2 format is a format that sub-samples chroma information compared to a YUV 4:4:4 format, so that chroma resolution is half that of luma resolution horizontally.

Alternatively, video can be organized according to another format (e.g., RGB 4:4:4 format, GBR 4:4:4 format or BGR 4:4:4 format) for encoding. In general, a primary component block is a block of sample values for a primary component (such as Y for a YUV format, or R for an RGB format), and a secondary component block is a block of sample values for a secondary component (such as U or V for a YUV format, or G or B for an RGB format).

Figure 4A:
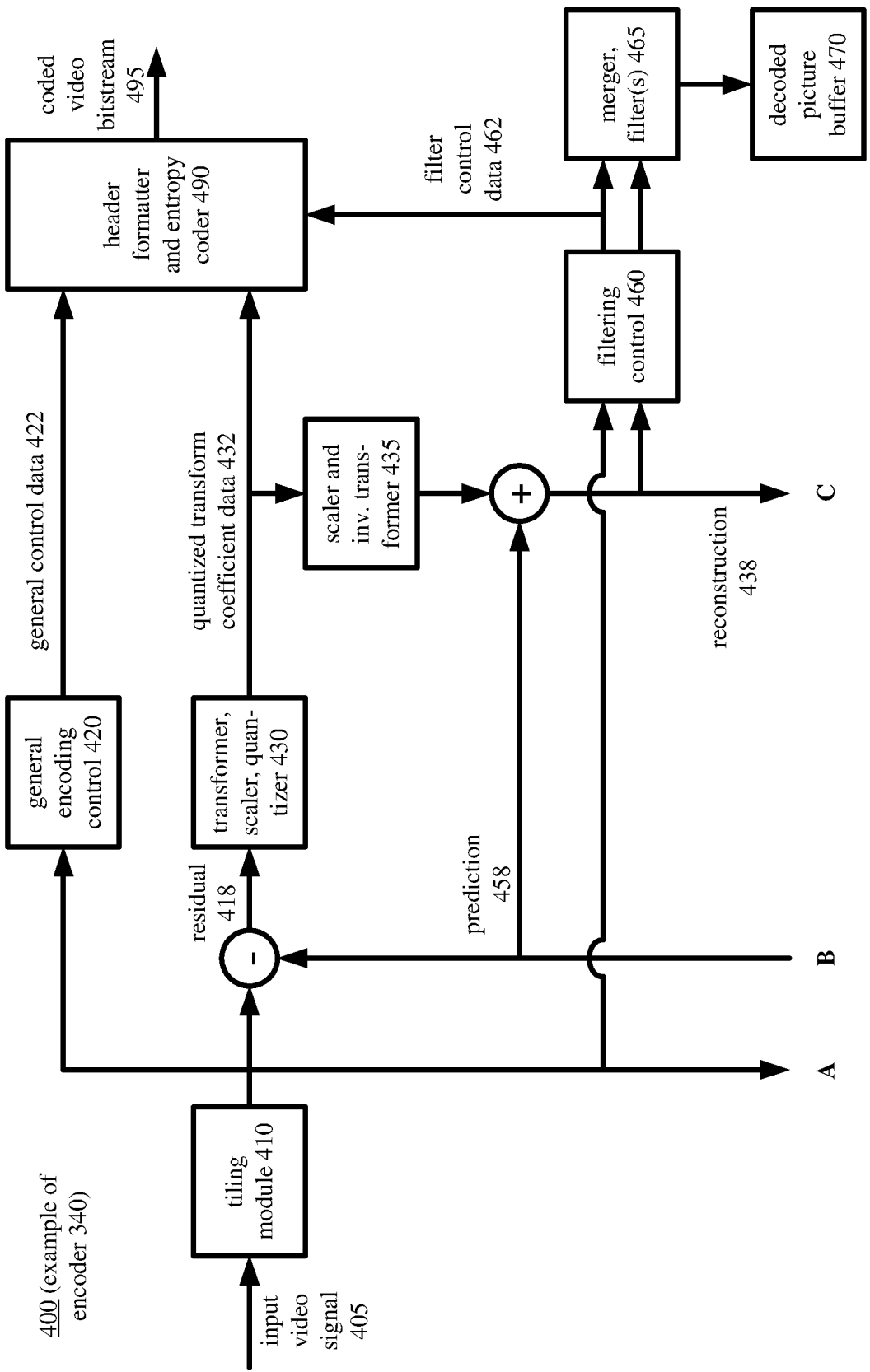
FIGS. 4a and 4b are diagrams illustrating an example video encoder, in conjunction with which some described embodiments can be implemented.
Figure 4B:
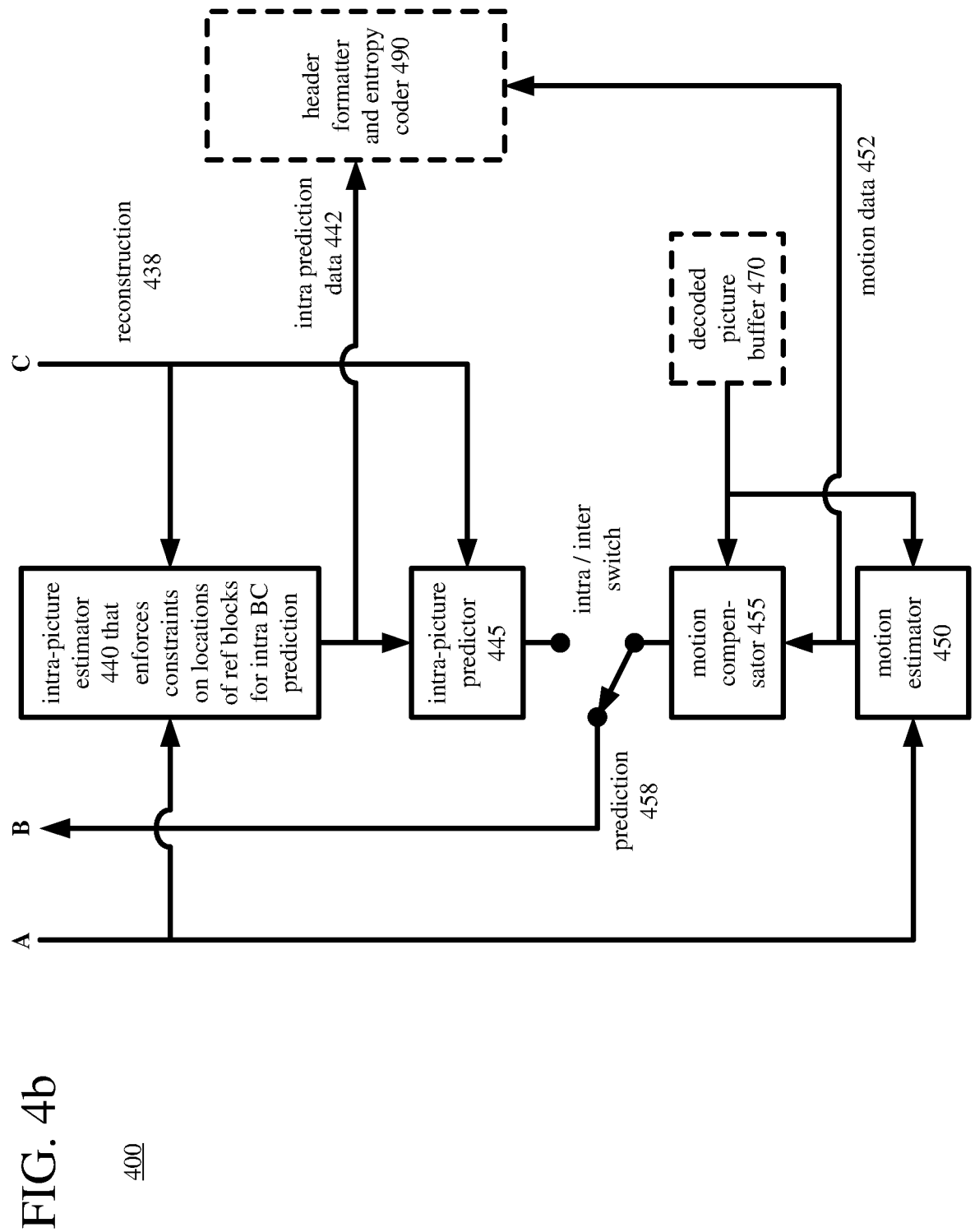

The encoder (340) encodes the selected picture (331) to produce a coded picture (341). FIGS. 4a and 4b are a block diagram of a generalized video encoder (400) in conjunction with which some described embodiments may be implemented. The encoder (400) receives the selected, current picture (331) from a sequence of video pictures as an input video signal (405) and produces encoded data for the coded picture (341) in a coded video bitstream (495) as output. The codec format of the coded video bitstream (495) can be an extension of AV1 format, VPx format (e.g., VP8, VP9), H.26x format (e.g., H.261, H.262, H.263, H.264, H.265), Windows Media Video format, VC-1 format, MPEG-x format (e.g., MPEG-1, MPEG-2, or MPEG-4), or another codec format.

The encoder (400) compresses pictures using intra-picture coding and inter-picture coding. Many of the components of the encoder (400) are used for both intra-picture coding and inter-picture coding. The exact operations performed by those components can vary depending on the codec format and the type of information being compressed.

A tiling module (410) optionally partitions a picture into multiple tiles of the same size or different sizes. For example, the tiling module (410) splits the picture along tile rows and tile columns that, with picture boundaries, define horizontal and vertical boundaries of tiles within the picture, where each tile is a rectangular region. Tiles are often used to provide options for parallel processing. In implementations that extend the AV1 format, the encoder (400) can also partition a picture into segments, and parameters of blocks (or superblocks) of a given segment can be collectively signaled for the given segment, which can improve compression efficiency. In implementations that extend the H.265 format, the encoder (400) partitions a picture into one or more slices, where each slice includes one or more slice segments. Thus, a slice can be an entire picture or a section of the picture. A slice can be decoded independently of other slices in a picture, which improves error resilience.

The content of a picture (or tile, slice, etc.) is further partitioned into blocks of sample values for purposes of encoding and decoding. The encoder (400) is block-based and uses a block format that depends on implementation. Blocks may be further sub-divided at different stages, e.g., at the prediction, frequency transform and/or entropy encoding stages. For example, a picture can be divided into 256×256 blocks, 128×128 blocks, 64×64 blocks, 32×32 blocks, or 16×16 blocks, which can in turn be divided into smaller blocks of sample values at different stages of coding and decoding.

In implementations of encoding for extensions of the AV1 format, for example, the encoder (400) partitions a picture (or tile) into superblocks. A superblock ("SB") includes luma sample values organized as a luma block and corresponding chroma sample values organized as chroma blocks. A root SB with size 128×128 can be recursively partitioned into smaller square SBs of size 64×64, 32×32, 16×16, or 8×8. A given square 2N×2N SB can also be partitioned into two rectangular N×2N or 2N×N SBs, in which case the smaller N×2N or 2N×N SBs are not further partitioned. Thus, the size of a SB can be 128×128, 128×64, 64×128, 64×64, 64×32, 32×64, 32×32, 32×16, 16×32, 16×16, 16×8, 8×16, or 8×8. Further, an 8×8 SB can be split into two 8×4 SBs, two 4×8 SBs, or four 4×4 SBs for some operations.

Generally, prediction operations are performed for a SB as a prediction unit. A SB may be split into smaller blocks for transform operations, or multiple SBs may be combined for a transform that covers multiple prediction units (SBs). Parameters such as prediction mode (inter or intra), motion vector ("MV") data, reference frame data, interpolation filter type, transform size and type, skip status, and segment index are typically specified for a SB. For a small SB (e.g., 8×4 SB, 4×8 SB, or 4×4 SB), however, some parameters (such as prediction mode and MV data) can be signaled for the small SB while other parameters are signaled for the 8×8 SB that includes the small SB.

In implementations of encoding for extensions of the H.265 standard, for example, the encoder (400) splits the content of a picture (or slice or tile) into coding tree units. A coding tree unit ("CTU") includes luma sample values organized as a luma coding tree block ("CTB") and corresponding chroma sample values organized as two chroma CTBs. The size of a CTU (and its CTBs) is selected by the encoder. A luma CTB can contain, for example, 64×64, 32×32 or 16×16 luma sample values. A CTU includes one or more coding units. A coding unit ("CU") has a luma coding block ("CB") and two corresponding chroma CBs. A CTU can be split into four CUs, with each CU possibly being split further into smaller CUs. The smallest allowable size of CU (e.g., 8×8, 16×16) can be signaled in the bitstream.

Generally, a CU has a prediction mode such as inter or intra. A CU includes one or more prediction units for purposes of signaling of prediction information (such as prediction mode details, displacement values, etc.) and/or prediction processing. A prediction unit ("PU") has a luma prediction block ("PB") and two chroma PBs. According to the H.265 standard, for an intra-predicted CU, the PU has the same size as the CU, unless the CU has the smallest size (e.g., 8×8). In that case, the CU can be split into smaller PUs (e.g., four 4×4 PUs, two 4×8 PUs, or two 8×4 PUs, if the smallest CU size is 8×8, for intra-picture prediction) or the PU can have the smallest CU size, as indicated by a syntax element for the CU. Alternatively, a larger CU can be split into multiple PUs. A CU also has one or more transform units for purposes of residual coding/decoding, where a transform unit ("TU") has a luma transform block ("TB") and two chroma TBs. A PU in an intra-predicted CU may contain a single TU (equal in size to the PU) or multiple TUs. The encoder decides how to partition video into CTUs, CUs, PUs, TUs, etc.

As used herein, the term "block" can indicate an m×n arrangement of sample values, a residual data unit, a CTB, a CB, a PB, a TB, or some other set of sample values, depending on context. The term "unit" can indicate a SB, a macroblock, a CTU, a CU, a PU, a TU, or some other set of blocks, or it can indicate a single block, depending on context. A luma block is an example of a primary component block for a YUV color space. The label "luma block" is sometimes used, however, to indicate a primary component block even for another color space such as an RGB color space, BGR color space, or GBR color space. Similarly, a chroma block is an example of a secondary component block for a YUV color space. The label "chroma block" is sometimes used, however, to indicate a secondary component block even for another color space such as an RGB color space, BGR color space, or GBR color space.

With reference to FIG. 4a, the general encoding control (420) receives pictures for the input video signal (405) as well as feedback (not shown) from various modules of the encoder (400). Overall, the general encoding control (420) provides control signals (not shown) to other modules (such as the tiling module (410), transformer/scaler/quantizer (430), scaler/inverse transformer (435), intra-picture estimator (440), intra-picture predictor (445), motion estimator (450), motion compensator (455) and intra/inter switch) to set and change coding parameters during encoding. In particular, the general encoding control (420) can decide whether and how to use intra BC prediction during encoding. The general encoding control (420) can also evaluate intermediate results during encoding, for example, performing rate-distortion analysis. The general encoding control (420) produces general control data (422) that indicates decisions made during encoding, so that a corresponding decoder can make consistent decisions. The general control data (422) is provided to the header formatter/entropy coder (490).

If the current picture is predicted using inter-picture prediction, a motion estimator (450) estimates the motion of blocks of sample values of a current picture of the input video signal (405) with respect to one or more reference pictures. For example, the motion estimator (450) estimates the motion of a current block of the current picture relative to one or more reference pictures. For motion estimation and compensation, a reference block is a block of sample values in a reference picture that is used to generate prediction values for the current block of sample values of the current picture. The decoded picture buffer (470) buffers one or more reconstructed previously coded pictures for use as reference pictures. When multiple reference pictures are used, the multiple reference pictures can be from different temporal directions or the same temporal direction. The motion estimator (450) produces as side information motion data (452) such as MV data, merge mode index values or other MV selection data, and reference picture selection data. The motion data (452) is provided to the header formatter/entropy coder (490) as well as the motion compensator (455).

The motion compensator (455) applies MVs to the reconstructed reference picture(s) from the decoded picture buffer (470). The motion compensator (455) produces motion-compensated predictions for blocks of the current picture.

In a separate path within the encoder (400), an intra-picture estimator (440) determines how to perform intra-picture prediction for blocks of sample values of a current picture of the input video signal (405) using other, previously reconstructed sample values in the current picture. The current picture can be entirely or partially coded using intra-picture coding. Using sample values of a reconstruction (438) of the current picture, for intra spatial prediction (extrapolation), the intra-picture estimator (440) determines how to spatially predict sample values of a current block of the current picture from neighboring, previously reconstructed sample values of the current picture.

Or, for intra BC prediction, the intra-picture estimator (440) estimates displacement from a current block of the current picture to a position in the other, previously reconstructed sample values of the current picture. For intra BC prediction, a reference block of sample values in the current picture is used to generate prediction values for the current block. For example, for intra BC prediction, the intra-picture estimator (440) estimates displacement from a current block to a reference block, which can be indicated with a BV value. When the intra-picture estimator (440) determines BV values for intra BC prediction, the intra-picture estimator (440) can enforce constraints on locations of reference blocks, as explained below.

Depending on implementation, the intra-picture estimator (440) can perform BV estimation for the current block using reconstructed sample values before in-loop filtering, using reconstructed sample values after in-loop filtering, or using input sample values. In general, by using unfiltered, reconstructed sample values (or input sample values) for BV estimation, the intra-picture estimator (440) can avoid a sequential-processing bottleneck (which may result from filtering reconstructed sample values before BV estimation/intra BC prediction). On the other hand, storing unfiltered, reconstructed sample values for BV estimation uses additional memory. Additional details about options for in-loop filtering are provided below.

The intra-picture estimator (440) produces as side information intra prediction data (442), such as information indicating whether intra prediction uses spatial prediction or intra BC prediction, prediction mode direction (for intra spatial prediction), and BV values (for intra BC prediction). The intra prediction data (442) is provided to the header formatter/entropy coder (490) as well as the intra-picture predictor (445).

According to the intra prediction data (442), the intra-picture predictor (445) spatially predicts sample values of a current block of the current picture from neighboring, previously reconstructed sample values of the current picture. Or, for intra BC prediction, the intra-picture predictor (445) predicts the sample values of a current block using previously reconstructed sample values of a reference block, which is indicated by a displacement (BV value) for the current block.

In some example implementations, intra BC prediction is a special case of motion compensation for which the reference picture is the current picture. In such implementations, functionality described above with reference to the intra-picture estimator (440) and intra-picture predictor (445) for BV estimation and intra BC prediction can be implemented in the motion estimator (450) and motion compensator (455), respectively. The motion estimator (450) can enforce constraints on locations of reference blocks, as explained below.

For a palette coding mode, the encoder (400) represents at least some of the sample values of a unit using a palette. The palette represents colors used in the unit. For example, the palette maps index values 0, 1, 2, . . . , p to corresponding colors, which can be in RGB 4:4:4 format, BGR 4:4:4 format, GBR 4:4:4 format, YUV 4:4:4 format, or another format (color space, color sampling rate). An index value can represent a RGB triplet, BGR triplet or GBR triplet for a pixel, where a pixel is a set of co-located sample values. For encoding of the unit, appropriate index values replace the sample values of pixels in the unit. A rare value in the unit can be encoded using an escape code value and literal values, instead of using an index value in the palette. The palette can change from unit to unit, and palette data specifying the palettes can be signaled in the bitstream.

The intra/inter switch selects whether the prediction (458) for a given block will be a motion-compensated prediction or intra-picture prediction.

In some example implementations, no residual is calculated for a unit encoded in palette coding mode or intra BC prediction mode. Instead, residual coding is skipped, and the predicted sample values are used as the reconstructed sample values. Alternatively, residual coding can be performed for a unit encoded in intra BC prediction mode.

When residual coding is not skipped, the difference (if any) between a block of the prediction (458) and a corresponding part of the original current picture of the input video signal (405) provides values of the residual (418). During reconstruction of the current picture, when residual values have been encoded/signaled, reconstructed residual values are combined with the prediction (458) to produce an approximate or exact reconstruction (438) of the original content from the video signal (405). (In lossy compression, some information is lost from the video signal (405).)

As part of residual coding, in the transformer/scaler/quantizer (430), when a frequency transform is not skipped, a frequency transformer converts spatial-domain video information into frequency-domain (i.e., spectral, transform) data. For block-based video coding, the frequency transformer applies a discrete cosine transform ("DCT"), an integer approximation thereof, or another type of forward block transform (e.g., a discrete sine transform or an integer approximation thereof) to blocks of prediction residual data (or sample value data if the prediction (458) is null), producing blocks of frequency transform coefficients. The transformer/scaler/quantizer (430) can apply a transform with variable block sizes. In this case, the transformer/scaler/quantizer (430) can determine which block sizes of transforms to use for the residual values for a current block. The scaler/quantizer scales and quantizes the transform coefficients. The encoder (400) can set values for quantization parameter ("QP") for a picture, tile, slice and/or other portion of video, and quantize transform coefficients accordingly. For example, the quantizer applies dead-zone scalar quantization to the frequency-domain data with a quantization step size that varies on a picture-by-picture basis, tile-by-tile basis, slice-by-slice basis, block-by-block basis, frequency-specific basis, or other basis. The quantized transform coefficient data (432) is provided to the header formatter/entropy coder (490). If the frequency transform is skipped, the scaler/quantizer can scale and quantize the blocks of prediction residual data (or sample value data if the prediction (458) is null), producing quantized values that are provided to the header formatter/entropy coder (490).

To reconstruct residual values, in the scaler/inverse transformer (435), a scaler/inverse quantizer performs inverse scaling and inverse quantization on the quantized transform coefficients. When the transform stage has not been skipped, an inverse frequency transformer performs an inverse frequency transform, producing blocks of reconstructed prediction residual values or sample values. If the transform stage has been skipped, the inverse frequency transform is also skipped. In this case, the scaler/inverse quantizer can perform inverse scaling and inverse quantization on blocks of prediction residual data (or sample value data), producing reconstructed values. When residual values have been encoded/signaled, the encoder (400) combines reconstructed residual values with values of the prediction (458) (e.g., motion-compensated prediction values, intra-picture prediction values) to form the reconstruction (438). When residual values have not been encoded/signaled, the encoder (400) uses the values of the prediction (458) as the reconstruction (438).

For intra-picture prediction, the values of the reconstruction (438) can be fed back to the intra-picture estimator (440) and intra-picture predictor (445). The values of the reconstruction (438) can be used for motion-compensated prediction of subsequent pictures.

The values of the reconstruction (438) can be further filtered. A filtering control (460) determines how to perform adaptive deblock filtering, sample adaptive offset ("SAO") filtering, and/or other filtering on values of the reconstruction (438), for a given picture of the video signal (405), within the motion compensation loop (that is, "in-loop" filtering). The filtering control (460) produces filter control data (462), which is provided to the header formatter/entropy coder (490) and merger/filter(s) (465).

In the merger/filter(s) (465), the encoder (400) merges content from different units (and tiles) into a reconstructed version of the picture. The encoder (400) selectively performs deblock filtering, SAO filtering, and/or other filtering (such as constrained directional enhancement filtering or loop restoration filtering) according to the filter control data (462) and rules for filter adaptation, so as to adaptively smooth discontinuities across boundaries in the pictures. Filtering such as de-ringing filtering or adaptive loop filtering (not shown) can alternatively or additionally be applied. Tile boundaries can be selectively filtered or not filtered at all, depending on settings of the encoder (400), and the encoder (400) may provide syntax elements within the coded bitstream to indicate whether or not such filtering was applied. The decoded picture buffer (470) buffers the reconstructed current picture for use in subsequent motion-compensated prediction.

The timing of in-loop filtering operations can increase memory cost or computational complexity of encoding when intra BC prediction is used. If intra BC prediction uses reconstructed sample values in the current picture after filtering, there may be delay while in-loop filtering operations are applied. On the other hand, if intra BC prediction uses reconstructed sample values in the current picture before in-loop filtering, an additional picture buffer may be needed to store unfiltered, reconstructed sample values for intra BC prediction (in addition to the picture buffer that stores filtered, reconstructed sample values). Also, if in-loop filtering is applied prior to BV estimation, there may be a region of filter support that overlaps a current block, which complicates memory access patterns. In some example implementations, in-loop filtering operations are disabled for a picture when intra BC prediction is enabled for that picture. With this constraint, an additional picture buffer is not needed—the single picture buffer stores unfiltered, reconstructed sample values. Alternatively, the encoder (400) can apply some in-loop filtering operations before BV estimation/intra BC prediction, and perform additional or alternative filtering in a later processing stage.

The header formatter/entropy coder (490) formats and/or entropy codes the general control data (422) (e.g., mode decisions), quantized transform coefficient data (432), intra prediction data (442) (e.g., BV values), motion data (452), and filter control data (462). For the motion data (452), the header formatter/entropy coder (490) can select and entropy code merge mode index values, or a default MV predictor can be used. In some cases, the header formatter/entropy coder (490) also determines MV differentials for MV values (relative to MV predictors for the MV values), then entropy codes the MV differentials. For the intra prediction data (442), a BV value can be encoded using prediction. The prediction can use a default predictor (e.g., a BV value from a neighboring unit, or median of BV values from multiple neighboring units). When multiple predictors are possible, a predictor index can indicate which of the multiple predictors to use for prediction of the BV value. The header formatter/entropy coder (490) can select and entropy code predictor index values (for intra BC prediction), or a default predictor can be used. In some cases, the header formatter/entropy coder (490) also determines differentials (relative to predictors for the BV values), then entropy codes the differentials. For palette coding mode, the header formatter/entropy coder (490) can encode palette data.

The header formatter/entropy coder (490) can perform entropy coding in various ways. Typical entropy coding techniques include Exponential-Golomb coding, Golomb-Rice coding, context-adaptive binary arithmetic coding ("CABAC"), differential coding, Huffman coding, run length coding, variable-length-to-variable-length ("V2V") coding, variable-length-to-fixed-length ("V2F") coding, Lempel-Ziv ("LZ") coding, dictionary coding, probability interval partitioning entropy coding ("PIPE"), and combinations of the above. The header formatter/entropy coder (490) can use different coding techniques for different kinds of data, can apply multiple techniques in combination (e.g., by applying Golomb-Rice coding followed by CABAC), and can choose from among multiple code tables or contexts within a particular coding technique.

The header formatter/entropy coder (490) provides the encoded data in the coded video bitstream (495). The codec format of the coded video bitstream (495) can be an extension of AV1 format, VPx format (e.g., VP8, VP9), H.26x format (e.g., H.261, H.262, H.263, H.264, H.265), Windows Media Video format, VC-1 format, MPEG-x format (e.g., MPEG-1, MPEG-2, or MPEG-4), or another codec format.

Depending on implementation and the type of compression desired, modules of an encoder (400) can be added, omitted, split into multiple modules, combined with other modules, and/or replaced with like modules. In alternative embodiments, encoders with different modules and/or other configurations of modules perform one or more of the described techniques. Specific embodiments of encoders typically use a variation or supplemented version of the encoder (400). The relationships shown between modules within the encoder (400) indicate general flows of information in the encoder; other relationships are not shown for the sake of simplicity.

With reference to FIG. 3, in addition to producing encoded data for a coded picture (341), the encoder (340) produces memory management control operation ("MMCO") signals (342) or reference picture set ("RPS") information. The RPS is the set of pictures that may be used for reference in motion compensation for a current picture or any subsequent picture. If the current picture is not the first picture that has been encoded, when performing its encoding process, the encoder (340) may use one or more previously encoded/decoded pictures (369) that have been stored in a decoded picture temporary memory storage area (360), which is an example of decoded picture buffer (470). Such stored decoded pictures (369) are used as reference pictures for inter-picture prediction of the content of the current source picture (331). The MMCO/RPS information (342) indicates to a decoder which reconstructed pictures may be used as reference pictures, and hence should be stored in a picture storage area.

The coded pictures (341) and MMCO/RPS information (342) (or information equivalent to the MMCO/RPS information (342), since the dependencies and ordering structures for pictures are already known at the encoder (340)) are processed by a decoding process emulator (350) in the encoder system (300) of FIG. 3. The decoding process emulator (350) implements some of the functionality of a decoder, for example, decoding tasks to reconstruct sample values of the current picture and reference pictures. (In practice, the decoding process emulator (350) is implemented as part of the encoder (340). For example, the decoding process emulator (350) includes the scaler and inverse transformer (435), the merger/filters (465) and other functionality to reconstruct sample values.) In a manner consistent with the MMCO/RPS information (342), the decoding processes emulator (350) determines whether a given coded picture (341) needs to be reconstructed and stored for use as a reference picture in inter-picture prediction of subsequent pictures to be encoded. If a coded picture (341) needs to be stored, the decoding process emulator (350) models the decoding process that would be conducted by a decoder that receives the coded picture (341) and produces a corresponding decoded picture (351). In doing so, when the encoder (340) has used decoded picture(s) (369) that have been stored in the decoded picture storage area (360), the decoding process emulator (350) also uses the decoded picture(s) (369) from the storage area (360) as part of the decoding process.

The decoded picture temporary memory storage area (360) includes multiple picture buffer storage areas (361, 362, . . . , 36$n$). In a manner consistent with the MMCO/RPS information (342), the decoding process emulator (350) manages the contents of the storage area (360) in order to identify any picture buffers (361, 362, etc.) with pictures that are no longer needed by the encoder (340) for use as reference pictures. After modeling the decoding process, the decoding process emulator (350) stores a newly decoded picture (351) in a picture buffer (361, 362, etc.) that has been identified in this manner.

The coded pictures (341) and MMCO/RPS information (342) are buffered in a temporary coded data area (370). The coded data that is aggregated in the coded data area (370) contains, as part of the syntax of an elementary coded video bitstream, encoded data for one or more pictures represented with syntax elements for various layers of bitstream syntax. The coded data that is aggregated in the coded data area (370) can also include media metadata relating to the coded video data (e.g., as one or more parameters in one or more supplemental enhancement information ("SEI") messages or video usability information ("VUI") messages).

The aggregated data (371) from the temporary coded data area (370) is processed by a channel encoder (380). The channel encoder (380) can packetize and/or multiplex the aggregated data for transmission or storage as a media stream (e.g., according to a media program stream or transport stream format), in which case the channel encoder (380) can add syntax elements as part of the syntax of the media transmission stream. Or, the channel encoder (380) can organize the aggregated data for storage as a file (e.g., according to a media container format), in which case the channel encoder (380) can add syntax elements as part of the syntax of the media storage file. Or, more generally, the channel encoder (380) can implement one or more media system multiplexing protocols or transport protocols, in which case the channel encoder (380) can add syntax elements as part of the syntax of the protocol(s). The channel encoder (380) provides output to a channel (390), which represents storage, a communications connection, or another channel for the output. The channel encoder (380) or channel (390) may also include other elements (not shown), e.g., for forward-error correction ("FEC") encoding and analog signal modulation.

IV. Example Decoder Systems and Video Decoders.

FIG. 5 is a block diagram of an example decoder system (500) in conjunction with which some described embodiments may be implemented. The decoder system (500) can be a general-purpose decoding tool capable of operating in any of multiple decoding modes such as a low-latency decoding mode for real-time communication and a higher-latency decoding mode for media playback from a file or stream, or it can be a special-purpose decoding tool adapted for one such decoding mode. The decoder system (500) can be implemented as part of an operating system module, as part of an application library, as part of a standalone application, using GPU hardware, or using special-purpose hardware. Overall, the decoder system (500) receives coded data from a channel (510) and produces reconstructed pictures as output for an output destination (590). The received encoded data can include content encoded using intra BC prediction with constraints on locations of reference blocks as described herein.

The decoder system (500) includes a channel (510), which can represent storage, a communications connection, or another channel for coded data as input. The channel (510) produces coded data that has been channel coded. A channel decoder (520) can process the coded data. For example, the channel decoder (520) de-packetizes and/or demultiplexes data that has been aggregated for transmission or storage as a media stream (e.g., according to a media program stream or transport stream format), in which case the channel decoder (520) can parse syntax elements added as part of the syntax of the media transmission stream. Or, the channel decoder (520) separates coded video data that has been aggregated for storage as a file (e.g., according to a media container format), in which case the channel decoder (520) can parse syntax elements added as part of the syntax of the media storage file. Or, more generally, the channel decoder (520) can implement one or more media system demultiplexing protocols or transport protocols, in which case the channel decoder (520) can parse syntax elements added as part of the syntax of the protocol(s). The channel (510) or channel decoder (520) may also include other elements (not shown), e.g., for FEC decoding and analog signal demodulation.

The coded data (521) that is output from the channel decoder (520) is stored in a temporary coded data area (530) until a sufficient quantity of such data has been received. The coded data (521) includes coded pictures (531) and MMCO/RPS information (532). The coded data (521) in the coded data area (530) contain, as part of the syntax of an elementary coded video bitstream, coded data for one or more pictures. The coded data (521) in the coded data area (530) can also include media metadata relating to the encoded video data (e.g., as one or more parameters in one or more SEI messages or VUI messages).

In general, the coded data area (530) temporarily stores coded data (521) until such coded data (521) is used by the decoder (550). At that point, coded data for a coded picture (531) and MMCO/RPS information (532) are transferred from the coded data area (530) to the decoder (550). As decoding continues, new coded data is added to the coded data area (530) and the oldest coded data remaining in the coded data area (530) is transferred to the decoder (550).

Figure 6:
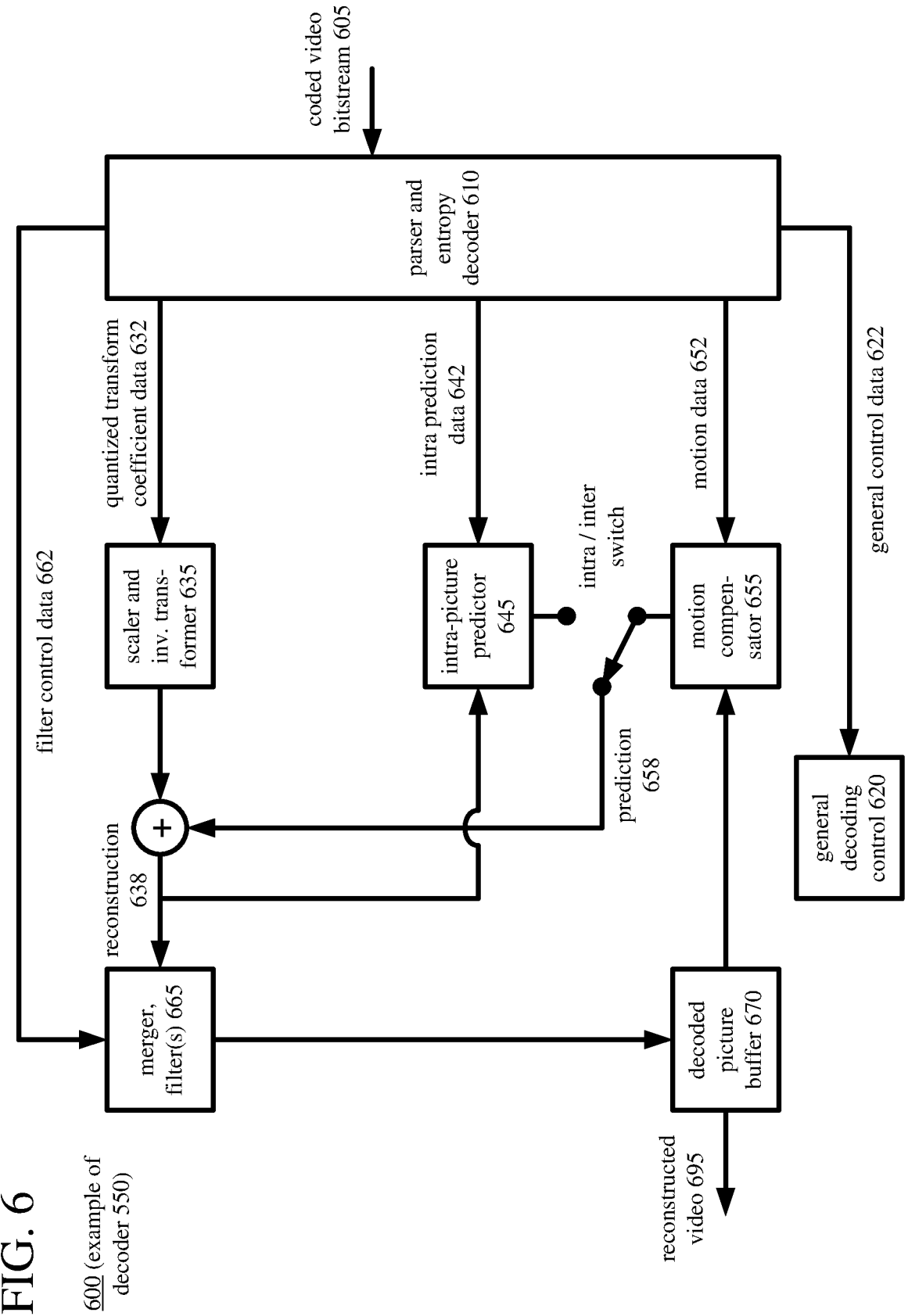
FIG. 6 is a diagram illustrating an example video decoder, in conjunction with which some described embodiments can be implemented.

The decoder (550) decodes coded data (521) for a coded picture (531) to produce a corresponding decoded picture (551). FIG. 6 is a block diagram of a generalized decoder (600) in conjunction with which some described embodiments may be implemented. The decoder (600) receives encoded data, for a coded picture (531), in a coded video bitstream (605) and produces reconstructed video (695) for output as the decoded picture (551). The codec format of the coded video bitstream (605) can be an extension of AV1 format, VPx format (e.g., VP8, VP9), H.26x format (e.g., H.261, H.262, H.263, H.264, H.265), Windows Media Video format, VC-1 format, MPEG-x format (e.g., MPEG-1, MPEG-2, or MPEG-4), or another codec format.

A picture can be organized as multiple tiles of the same size or different sizes. In implementations that extend the AV1 format, a picture can also be organized as one or more segments. In implementations that extend the H.265 format, a picture can also be organized as one or more slices. The content of a picture (or tile or slice) is further organized as blocks of sample values. The decoder (600) is block-based and uses a block format that depends on implementation. Blocks may be further sub-divided at different stages. For example, a picture can be divided into 256×256 blocks, 128×128 blocks, 64×64 blocks, 32×32 blocks or 16×16 blocks, which can in turn be divided into smaller blocks of sample values. In implementations of decoding for extensions of the AV1 format, a picture is partitioned into root SBs, as described above, which can be recursively partitioned into smaller SBs. In implementations of decoding for the H.265 standard, a picture is partitioned into CTUs (CTBs), CUs (CBs), PUs (PBs), and TUs (TBs), as described above.

The decoder (600) decompresses pictures using intra-picture decoding and inter-picture decoding. Many of the components of the decoder (600) are used for both intra-picture decoding and inter-picture decoding. The exact operations performed by those components can vary depending on the codec format and type of information being decompressed.

A buffer receives encoded data in the coded video bitstream (605) and makes the received encoded data available to the parser/entropy decoder (610). The parser/entropy decoder (610) entropy decodes entropy-coded data, typically applying the inverse of entropy coding performed in the encoder (500) (e.g., context-adaptive binary arithmetic decoding). As a result of parsing and entropy decoding, the parser/entropy decoder (610) produces general control data (622), quantized transform coefficient data (632), intra prediction data (642), motion data (652) and filter control data (662). For the intra prediction data (642), if predictor index values are signaled, the parser/entropy decoder (610) can entropy decode the predictor index values, e.g., using context-adaptive binary arithmetic decoding. In some cases, the parser/entropy decoder (610) also entropy decodes differentials for BV values (e.g., using context-adaptive binary arithmetic decoding), then combines the differentials with corresponding predictors to reconstruct the BV values. In other cases, the differential is omitted from the bitstream, and the BV value is simply the predictor (e.g., indicated with the predictor index value). For palette decoding mode, the parser/entropy decoder (610) can decode palette data.

The general decoding control (620) receives the general control data (622) and provides control signals (not shown) to other modules (such as the scaler/inverse transformer (635), intra-picture predictor (645), motion compensator (655) and intra/inter switch) to set and change decoding parameters during decoding.

If the current picture is predicted using inter-picture prediction, a motion compensator (655) receives the motion data (652), such as MV data, reference picture selection data, and merge mode index values or other MV selection data. The motion compensator (655) applies MVs to the reconstructed reference picture(s) from the decoded picture buffer (670). The motion compensator (655) produces motion-compensated predictions for inter-coded blocks of the current picture. The decoded picture buffer (670) stores one or more previously reconstructed pictures for use as reference pictures. (In FIG. 5, the decoded picture temporary memory storage area (560) is an example of decoded picture buffer. The decoded picture temporary memory storage area (560) includes multiple picture buffer storage areas (561, 562, . . . , 56n), from which the decoder (550) reads reconstructed sample values of previously decoded pictures (569).)

In a separate path within the decoder (600), the intra-picture predictor (645) receives the intra prediction data (642), such as information indicating whether intra-picture prediction uses spatial prediction or intra BC prediction, as well as prediction mode direction (for intra spatial prediction) or BV values (for intra BC prediction). For intra spatial prediction, using values of a reconstruction (638) of the current picture, according to prediction mode data, the intra-picture predictor (645) spatially predicts sample values of a current block of the current picture from neighboring, previously reconstructed sample values of the current picture. Or, for intra BC prediction, the intra-picture predictor (645) predicts the sample values of a current block using previously reconstructed sample values of a reference block (in the current picture), which is indicated by a displacement (BV value) for the current block. The BV values are consistent with constraints on locations of reference blocks, as explained below.

In some example implementations, intra BC prediction is a special case of motion compensation for which the reference picture is the current picture. In such implementations, functionality described above with reference to the intra-picture predictor (645) for intra BC prediction can be implemented in the motion compensator (655).

For a palette decoding mode, the decoder (600) uses a palette that represents at least some of the sample values of a unit. The palette maps index values to corresponding colors used in the unit. For example, the palette maps index values 0, 1, 2, . . . , p to corresponding colors, which can be in RGB 4:4:4 format, BGR 4:4:4 format, GBR 4:4:4 format, YUV 4:4:4 format, or another format (color space, color sampling rate). An index value can represent a RGB triplet, BGR triplet or GBR triplet for a pixel. During decoding, for positions in the unit, index values from the palette are replaced with the appropriate sample values. An escape-coded value in the unit can be decoded using an escape code value and literal values. The palette can change from unit to unit, based on palette data signaled in the bitstream.

The intra/inter switch selects values of a motion-compensated prediction or intra-picture prediction for use as the prediction (658) for a given block. For example, the intra/inter switch can be controlled based on a syntax element encoded for a unit of a picture that can contain intra-predicted units and inter-predicted units.

When residual values have been encoded/signaled, the decoder (600) combines the prediction (658) with reconstructed residual values to produce the reconstruction (638) of the content from the video signal. When residual values have not been encoded/signaled, the decoder (600) uses the values of the prediction (658) as the reconstruction (638). As previously noted, in some example implementations, no residual is calculated for a unit encoded in palette coding mode or intra BC prediction mode. Instead, residual coding is skipped, and the predicted sample values are used as the reconstructed sample values. Alternatively, residual coding can be performed for a unit encoded in intra BC prediction mode.

To reconstruct the residual when residual values have been encoded/signaled, the scaler/inverse transformer (635) receives and processes the quantized transform coefficient data (632). In the scaler/inverse transformer (635), a scaler/inverse quantizer performs inverse scaling and inverse quantization on the quantized transform coefficients. For example, the scaler/inverse quantizer sets values for QP for a picture, tile, slice and/or other portion of video based on syntax elements in the bitstream, and inverse quantizes transform coefficients accordingly. An inverse frequency transformer performs an inverse frequency transform, producing blocks of reconstructed prediction residual values or sample values. The inverse frequency transform can be an inverse DCT, an integer approximation thereof, or another type of inverse frequency transform (e.g., an inverse discrete sine transform or an integer approximation thereof). If the frequency transform was skipped during encoding, the inverse frequency transform is also skipped. In this case, the scaler/inverse quantizer can perform inverse scaling and inverse quantization on blocks of prediction residual data (or sample value data), producing reconstructed values.

For intra-picture prediction, the values of the reconstruction (638) can be fed back to the intra-picture predictor (645). For inter-picture prediction, the values of the reconstruction (638) can be further filtered. In the merger/filter(s) (665), the decoder (600) merges content from different units into a reconstructed version of the picture. The decoder (600) selectively performs adaptive deblock filtering, SAO filtering, and/or other filtering (such as constrained directional enhancement filtering and loop restoration filtering) within the motion compensation loop according to the filter control data (662) and rules for filter adaptation, so as to adaptively smooth discontinuities across boundaries in the pictures. Filtering such as de-ringing filtering or adaptive loop filtering (not shown) can alternatively or additionally be applied. Tile boundaries can be selectively filtered or not filtered at all, depending on settings of the decoder (600) or a syntax element within the encoded bitstream data. The decoded picture buffer (670) buffers the reconstructed current picture for use in subsequent motion-compensated prediction. (With reference to FIG. 5, the decoder (550) can use the MMCO/RPS information (532) to identify a picture buffer (561, 562, etc.) in which it can store a decoded picture (551). The decoder (550) stores the decoded picture (551) in that picture buffer.)

As explained in section III, the timing of in-loop filtering operations can increase memory cost or computational complexity of decoding when intra BC prediction is used. If intra BC prediction uses reconstructed sample values in the current picture after filtering, there may be delay while in-loop filtering operations are applied. On the other hand, if intra BC prediction uses reconstructed sample values in the current picture before in-loop filtering, an additional picture buffer may be needed to store unfiltered, reconstructed sample values for intra BC prediction (in addition to the picture buffer that stores filtered, reconstructed sample values). In some example implementations, in-loop filtering operations are disabled for a picture when intra BC prediction is enabled for that picture. With this constraint, an additional picture buffer for unfiltered, reconstructed sample values is not needed—the single picture buffer stores unfiltered, reconstructed sample values. Alternatively, the decoder (600) can apply some in-loop filtering operations before intra BC prediction, and perform additional or alternative filtering in a later processing stage.

The decoder (600) can also include a post-processing filter. The post-processing filter can perform deblock filtering, de-ringing filtering, adaptive Wiener filtering, film-grain reproduction filtering, SAO filtering or another kind of filtering. Whereas "in-loop" filtering is performed on reconstructed sample values of pictures in a motion compensation loop, and hence affects sample values of reference pictures, the post-processing filter is applied to reconstructed sample values outside of the motion compensation loop, before output for display.

Depending on implementation and the type of decompression desired, modules of the decoder (600) can be added, omitted, split into multiple modules, combined with other modules, and/or replaced with like modules. In alternative embodiments, decoders with different modules and/or other configurations of modules perform one or more of the described techniques. Specific embodiments of decoders typically use a variation or supplemented version of the decoder (600). The relationships shown between modules within the decoder (600) indicate general flows of information in the decoder; other relationships are not shown for the sake of simplicity.

With reference to FIG. 5, an output sequencer (580) identifies when the next picture to be produced in output order is available in the decoded picture storage area (560). When the next picture (581) to be produced in output order is available in the decoded picture storage area (560), it is read by the output sequencer (580) and output to the output destination (590) (e.g., display). In general, the order in which pictures are output from the decoded picture storage area (560) by the output sequencer (580) may differ from the order in which the pictures are decoded by the decoder (550).

V. Constraints on Locations of Reference Blocks for Intra BC Prediction.

This section presents examples of various constraints on locations of reference blocks for intra block copy ("BC") prediction.

A. Intra BC Prediction—Introduction.

In general, intra BC prediction mode uses intra-picture prediction in which sample values of a current block of a picture are predicted using reconstructed sample values in the same picture. A block vector ("BV") value indicates a displacement from the current block to a block of the picture (the "reference block") that includes the reconstructed sample values used for prediction. The reference block provides predicted values for the current block. The sample values used for prediction are previously reconstructed sample values, which are thus available at the encoder during encoding and available at the decoder during decoding. The BV value is signaled in the bitstream, and a decoder can use the BV value to determine the reference block of the picture to use for prediction.

Figure 7:
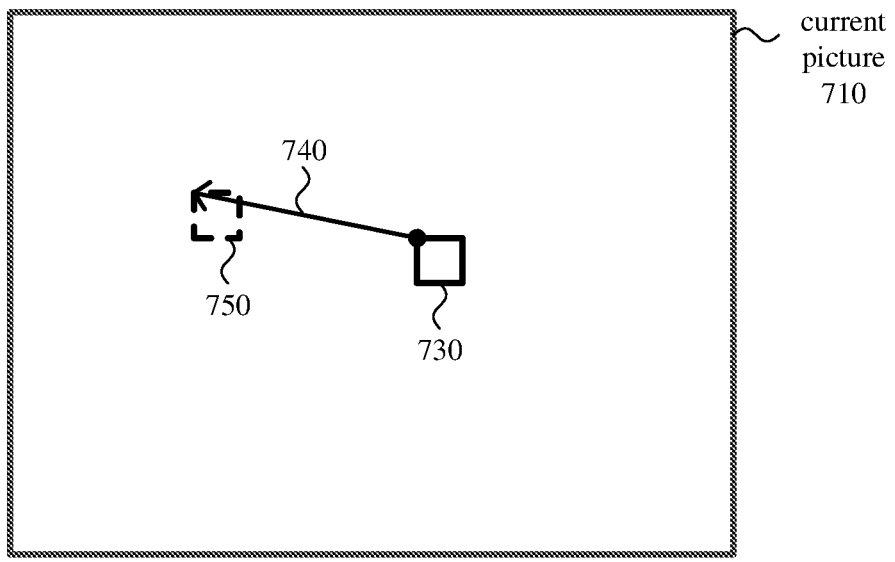
FIGS. 7 and 8 are diagrams illustrating aspects of intra BC prediction for a current block of a picture.

FIG. 7 shows an example (700) of intra BC prediction for a current block (730) of a current picture (710). The current block can be a block of a root SB, a block of a macroblock ("MB"), a prediction block ("PB") of a prediction unit ("PU"), or other block. The block can be a primary component block (e.g., luma block) or secondary component block (e.g., chroma block). The size of the current block can be 128×128, 128×64, 64×128, 64×64, 64×32, 32×64, 32×32, 32×16, 16×32, 16×16, 16×8, 8×16, 8×8, 8×4, 4×8, 4×4 or some other size. Blocks can result from symmetric or asymmetric partitioning of a larger block into smaller blocks for purposes of intra BC prediction. More generally, the size of the current block is m×n, where each of m and n is a whole number, and where m and n can be equal to each other or can have different values. Thus, the current block can be square or rectangular. Alternatively, the current block can have some other shape.

The BV value (740) indicates a displacement (or offset) from the current block (730) to a reference block (750), within the current picture (710), that includes the reconstructed sample values used for prediction. The sample values of the reference block (750) can be identical to the sample values of the current block (730), or they can be an approximation of the sample values of the current block (730). Suppose the top-left position of a current block is at position $(x_0, y_0)$ in the current picture, and suppose the top-left position of the reference block is at position $(x_1, y_1)$ in the current picture. The BV value indicates the displacement $(x_1-x_0, y_1-y_0)$. For example, if the top-left position of the current block is at position (256, 128), and the top-left position of the reference block is at position (106, 104), the BV value is (−150, −24). In this example, a negative horizontal displacement indicates a position to the left of the current block, and a negative vertical displacement indicates a position above the current block.

Figure 8:
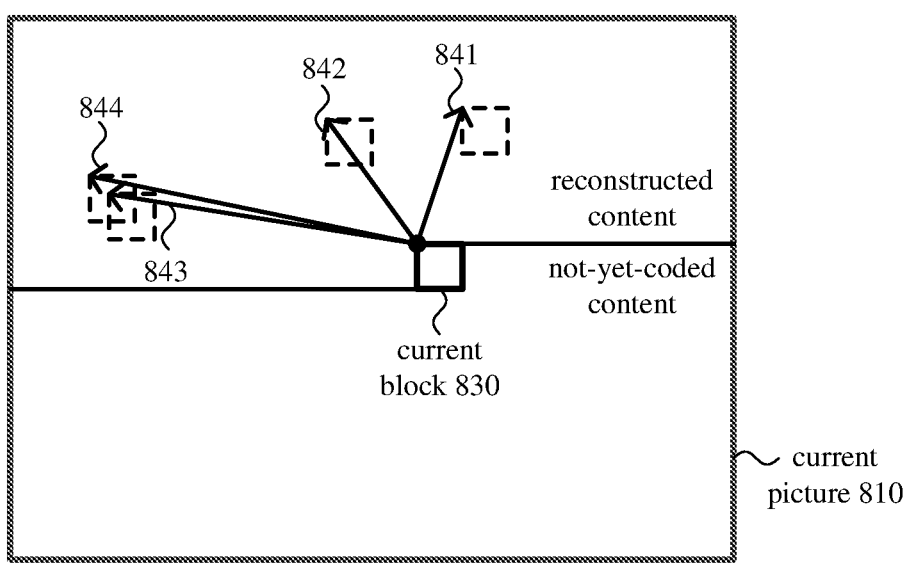

FIG. 8 shows an example (800) illustrating some of the candidate reference blocks for a current block (830) of a current picture (810). Four BV values (841, 842, 843, 844) indicate displacements for four candidate reference blocks. A candidate reference block can overlap with other candidate reference blocks, as shown for the candidate reference blocks indicated by the BV values (843, 844). In FIG. 8, the search area for candidate reference blocks for the current block (830) covers all of the previously reconstructed content of the current picture (810). In practice, various constraints can limit the locations for candidate reference blocks, as described below.

B. Example Syntax, Range, and Precision for BV Values.

In general, the BV value for a block can be signaled at unit level, in which case other blocks in the unit use the same BV value or a scaled version thereof. Alternatively, different BV values can be found for different blocks of a unit. A BV value "associated with" a unit can be a BV value for all blocks of that unit or a BV value for a single block of that unit.

A BV value associated with a unit can be signaled in various ways. For example, a flag in the bitstream indicates whether or not intra BC prediction is used for a unit. If intra BC prediction is used, the difference between the BV value associated with the unit and a predicted BV value is signaled in the bitstream. The predicted BV value can be determined according to any of various rules (e.g., the predicted BV value is: (a) the BV value of the unit to the left of the current unit; (b) the median of the BV values of the units to the left, above, and above-right of the current unit; (c) the median of the BV values of the units to the left, above, and above-left of the current unit; or (d) a BV value selected from among multiple candidate BV values, as indicated by an index value or other data signaled in the bitstream). During encoding, an encoder determines a BV difference value between the BV value associated with the unit and the predicted BV value, and the encoder signals the BV difference value in the bitstream. During corresponding decoding, a decoder reconstructs the BV difference value and combines the BV difference value with the predicted BV value.

The BV difference value can be signaled in any of various ways. For example, horizontal and vertical components of the BV difference value can be signaled jointly or separately. In some example implementations, a BV type syntax element indicates whether the horizontal and vertical components, respectively, of the BV difference value are zero or non-zero. If the horizontal component of the BV difference value is non-zero, the horizontal component of the BV difference value is signaled in the bitstream. If the vertical component of the BV difference value is non-zero, the vertical component of the BV difference value is signaled in the bitstream. The BV type syntax element, horizontal component (if present), and vertical component (if present) can be entropy coded.

To limit the bit rate cost associated with signaling of BV values, the range of BV values can be constrained. The range of BV values can be the same horizontally and vertically, or range of BV values can be different horizontally and vertically. For example, the range is [−1023, 1023] for the horizontal component of a BV value, and the range is [−1023, 124] for the vertical component of a BV value. Alternatively, the horizontal component and/or vertical component of a BV value can have other ranges.

When encoding screen content, most displacements for intra BC prediction or motion compensation are integer-sample displacements. In contrast, fractional-sample displacements are common in motion compensation when encoding natural video. In some example implementations, the BV value associated with a unit has integer-sample value resolution for intra BC prediction. Alternatively, the BV value associated with a unit can have fractional-sample value resolution (e.g., ½-sample value resolution, ¼-sample value resolution). In implementations in which intra BC prediction is a special case of motion compensation, the resolution of MV/BV values can change adaptively (e.g., on a picture-by-picture basis, on a slice-by-slice basis, or on some other basis), depending on the type of content being encoded.

In some example implementations, a BV value is signaled for a unit, and the BV value is applied for all blocks of the unit. Depending on color space and color sampling rate, the BV value can be used for all blocks without scaling, or the BV value can be scaled for blocks in different color components. For example, if the format of the picture is YUV 4:2:0, the BV value is scaled by a factor of two horizontally and scaled by a factor of two vertically. Or, if the format of the picture is YUV 4:2:2, the BV value is scaled by a factor of two horizontally. On the other hand, if the format of the picture is YUV 4:4:4, RGB 4:4:4, BGR 4:4:4, or GBR 4:4:4, the BV value used in intra BC prediction for a primary component block is not scaled before use in intra BC prediction for secondary component blocks.

C. Example BV Estimation Strategies.

Intra BC prediction can improve coding efficiency by exploiting redundancy (such as repeated patterns inside a picture) using BC operations. Finding a matching reference block for a current block can be computationally complex and time consuming, however, considering the number of candidate reference blocks that the encoder may evaluate. To find the BV value(s) to apply in intra BC prediction for a unit, an encoder can adopt various strategies.

For example, to determine the BV value associated with a current unit, an encoder can use exhaustive block matching—checking every candidate reference block for a current block using block-wise comparisons of sample values. In most cases, an exhaustive block matching approach is not feasible due to the computational complexity of the approach.

Instead, to determine the BV value associated with a current unit, an encoder can use block matching according to a search pattern. The encoder checks candidate reference blocks along the search pattern, starting with candidate reference blocks that are likely to provide good matches, and stopping if a suitable candidate reference block is found. The criteria for what constitutes a "suitable" match can account for sample value differences (error) as well as bit rate associated with signaling the associated BV value. Typically, the encoder continues searching along the search pattern so long as candidate reference blocks keep providing a better match for the current block, but stops if the match quality worsens. For example, the encoder follows a diamond search pattern starting from a most likely candidate reference block (e.g., the candidate reference block indicated by a predicted BV value), and continuing along successively larger diamond patterns that encircle the starting location until a suitable match is found and a successive candidate reference block along the search pattern provides a worse match. Alternatively, an encoder can follow another search pattern. Block matching according to a search pattern is typically much faster than an exhaustive search, but an encoder may determine a BV value that is "locally optimal" but not the best possible BV value.

As another option, to determine the BV value associated with a current unit, an encoder can use hash-based block matching. Examples of hash-based block matching are described in PCT Patent Application Publication Nos. WO 2015/058395 and WO 2015/131325. When an encoder uses hash-based block matching, the encoder determines a hash value for each of multiple candidate reference blocks of a picture. The encoder also determines a hash value for a current block. If two blocks are identical, their hash values are the same. Using hash values, an encoder can quickly and efficiently identify candidate reference blocks that have the same hash value as the current block, and filter out candidate reference blocks that have different hash values. The encoder can then further evaluate those candidate reference blocks having the same hash value as the current block (e.g., by comparing sample values or by comparing other hash values). Hash-based block matching usually speeds up the process of finding a matching block for a current block.

Calculating hash values for each possible block size can involve redundant computation. To reduce computational complexity, in some example implementations, a hash dictionary (also called a hash table) is constructed in a bottom-up manner, which can reduce the complexity of generating the hash dictionary. For one 2N×2N block (for N=2, 4, 8, 16, 32, or 64), a hash value is calculated based on the four N×N blocks of the 2N×2N block. This process continues recursively until 2×2 blocks (N=1) are reached. For a 2×2 block, the hash value is calculated from luma sample values of the 2×2 block. The hash value of a 4×4 block is determined by applying a hash function to the hash values of the four 2×2 blocks of the 4×4 block, and so on. Hash values for non-square block sizes can be similarly calculated in a bottom-up manner.

The hash function for a block is, for example, a CRC function that produces 16-bit hash values or 24-bit hash values. Alternatively, another hash function can be used.

For 16-bit hash values, the number of possible hash values is $2^{16}$. For 24-bit hash values, the number of possible hash values is $2^{24}$. Even with many possible hash values, there can be hash value collisions in which two or more candidate reference blocks with different sample values have the same hash value. To make hash value collisions less likely, the hash value range could be increased, but that would also increase the memory cost for the hash dictionary. Another option is to use a second hash function and inverted index table for an iterative, hierarchical hash-based block matching approach. For example, hash values from a first hash function (such as 16-bit hash values) for candidate reference blocks are used to build an inverted index table. When multiple candidate reference blocks have the same hash value from the first hash function, hash values from a second hash function (e.g., 24-bit hash values) for those candidate reference blocks are added to the inverted index table. If hash values from the first hash function match for a current block and candidate reference block, hash values from the second hash function for the current block and candidate reference block are compared. If those hash values match, the candidate reference block is deemed to match the current block.

For additional details about example data structures for a hash dictionary, example hash functions, example strategies for hash-based block matching, and optimizations (e.g., not computing hash values for simple blocks), see PCT Patent Application Publication Nos. WO 2015/058395 and WO 2015/131325.

As another option, to determine the BV value associated with a current unit, an encoder can use a combination of hash-based block matching and block matching according to a search pattern. In some example implementations, an encoder constructs a hash dictionary for candidate reference blocks in a current picture using luma sample values (that is, input luma sample values) of the current picture. For a current block (current unit), the encoder first performs block matching according to a diamond search pattern, determining a BV value associated with the current unit. Then, the encoder performs hash-based block matching—calculating a 16-bit hash value and a 24-bit hash value for the luma sample values of the current block, and checking the hash dictionary for matches between the current block and candidate reference blocks. If there are multiple matches, the encoder can sort the matches according to distance from the current block to the respective candidate reference blocks, choosing the nearest x matching blocks (where x is, e.g., 5). The encoder determines a BV value associated with the current unit from the results of hash-based block matching. The encoder then selects between the BV values determined from hash-based block matching and block matching according to the diamond search pattern (e.g., via rate-distortion optimization).

Alternatively, the encoder can perform BV estimation in some other way.

D. Examples of Constraints on BV Values to Avoid Inefficient Memory Access Patterns in Hardware-Based Implementations of Intra BC Prediction.

A hardware-based encoder or hardware-based decoder typically has a hierarchical memory structure that includes "on-chip" memory and "off-chip" memory. The on-chip memory can be accessed quickly by processing cores, but is small due to cost considerations. For example, the on-chip memory is static memory such as one or more memory caches, which are fast to access but small. In typical encoding/decoding scenarios, on-chip memory stores some reconstructed sample values (e.g., for a root SB or CTU being encoded/decoded) but is not large enough to store reconstructed sample values for an entire picture being encoded/decoded or available reference pictures. The processing cores can also access off-chip memory, which is much larger than the on-chip memory but subject to rules for efficient access. For example, when a cache between processing cores and off-chip memory is not practical, access to off-chip memory happens through bulk (batch) operations—writing or reading to a whole memory bank instead of a few bytes. As a result, in typical encoding/decoding scenarios, there is a delay in writing reconstructed sample values for a current unit (e.g., root SB, CTU) from on-chip memory back to a picture buffer in off-chip memory. The picture buffer in off-chip memory can store reconstructed sample values for the entire picture being encoded/decoded. Other picture buffers in off-chip memory can store reference pictures.

In some previous approaches to intra BC prediction (e.g., in the H.265 standard), a reference block can be located anywhere in previously reconstructed content in the current picture being encoded/decoded, even right next to the current block. Thus, a reference block can be outside a CTU that includes a current CU, inside the CTU, or even across the boundary of the CTU. In such approaches, intra BC prediction can be very effective in terms of lowering bit rate and improving quality, since a nearby reference block may closely match the current block. In hardware implementations, however, memory access operations can be slow and inefficient when reconstructed sample values for one part of a reference block (close to the current block) are stored in on-chip memory but reconstructed sample values for the rest of the reference block (further from the current block) are separately stored in off-chip memory.

When determining the BV value associated with a current unit of a picture, an encoder can enforce various constraints on the location of the reference block indicated by the BV value, so as to avoid inefficient patterns of memory access during intra BC prediction operations for a hardware-based encoder or hardware-based decoder. This section details examples of such constraints. The constraints, which are enforced by an encoder during BV estimation, can alternatively be expressed in terms of bitstream conformance requirements for BV values in a codec format.

Figure 9A:
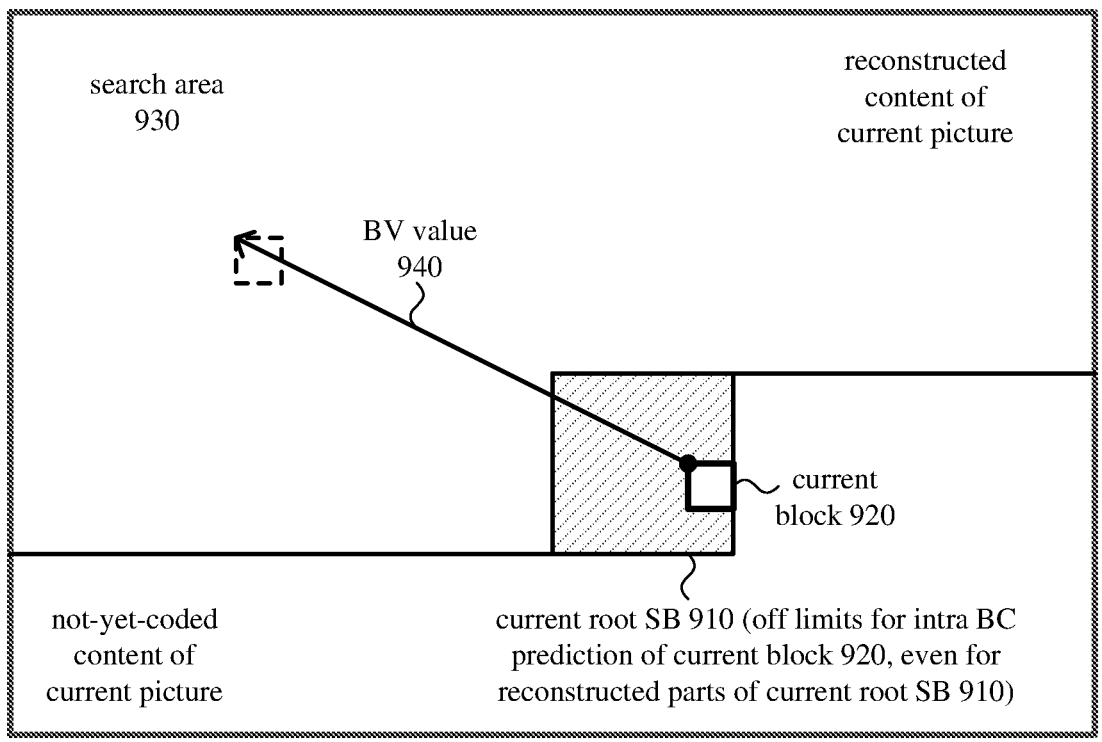
FIGS. 9a, 9b, and 10-12 are diagrams illustrating aspects of example constraints on locations of reference blocks for intra BC prediction.

For example, in some previous approaches to intra BC prediction (e.g., for some variations of the AV1 format) a reference block is constrained to be outside the root SB that includes the current unit. Specifically, for a current unit that is part of a current root SB, when encoding/decoding the current unit with intra BC prediction, a reference block is constrained to be outside the current root SB. FIG. 9a shows an example (901) of such a constraint. The current picture being encoded/decoded has multiple root SBs, including the current root SB (910) being encoded/decoded. The current block (920) is part of the current root SB (910). A BV value (940) indicates the location of a candidate reference block in a search area (930). The search area (930) includes reconstructed content of previous root SBs of the current picture, but not the current root SB (910). The BV value (940) can indicate the location of a candidate reference block anywhere in the search area (930). A reference block cannot, however, be located anywhere in the not-yet-coded content of the current picture. Also, a reference block cannot be located (even partially) within the current root SB (910), even for parts of the current root SB (910) that have already been reconstructed. No part of a reference block can overlap the current root SB (920). Thus, the current root SB (910) is off limits for intra BC prediction of the current block (920), even for previously reconstructed parts of the current root SB (910).

With such a constraint on location of the reference block, intra BC prediction is more "hardware friendly" since slow, inefficient memory access operations for reference blocks split between on-chip memory and off-chip memory can be avoided. The constraint on location of the reference block is consistent with the delay to batch reconstructed sample values of the current root SB for writing from on-chip memory to off-chip memory. On the other hand, intra BC prediction may be less effective in terms of lowering bit rate and improving quality since reference blocks nearest the current block might not be allowed. Since SBs can be quite large (e.g., 128×128), the impact on compression efficiency can be significant when nearby reference blocks are not allowed.

Even more restrictive constraints on the location of reference blocks can be enforced. For example, a reference block can be constrained to be outside the root SB that includes the current unit and also outside the previous root SB to the left, if any. In this case, for 128×128 root SBs, there can be a "delay" region of 256×256 within which the reference block cannot be located, which further hurts compression efficiency.

Figure 9B:
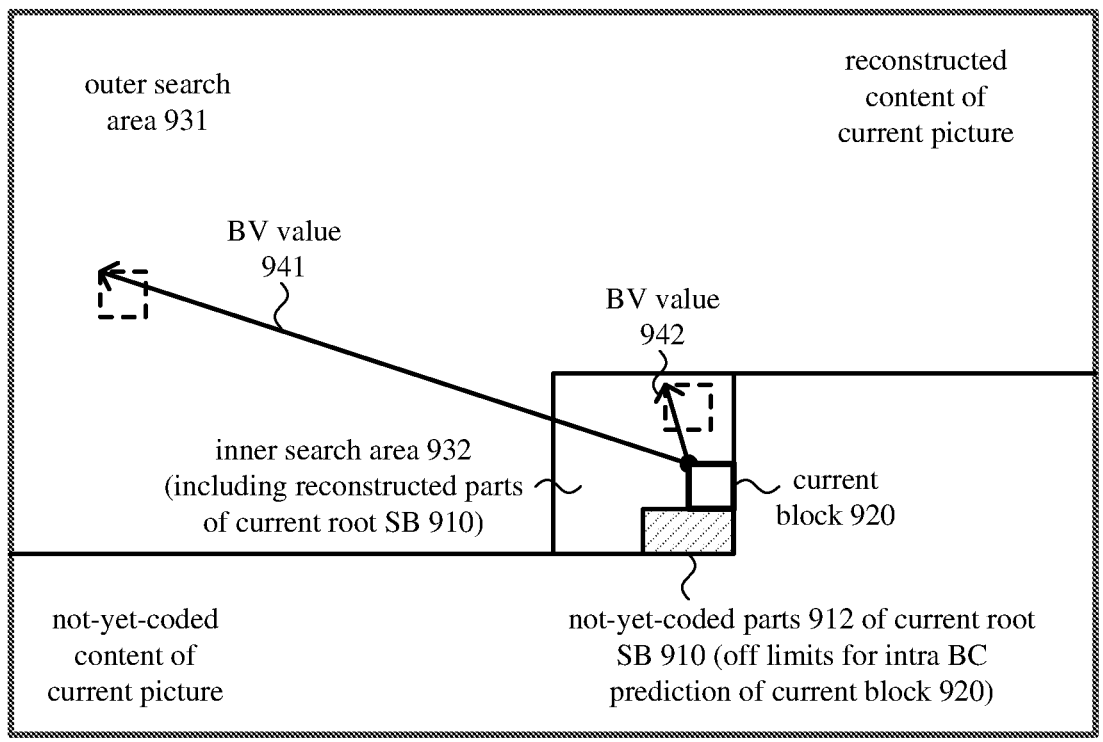

FIG. 9b shows an example (902) of another constraint that can help a hardware-based encoder or hardware-based decoder avoid inefficient patterns of memory access during intra BC prediction operations, with a much smaller penalty on compression efficiency. The current picture being encoded/decoded has multiple root SBs, including the current root SB (910) being encoded/decoded. The current block (920) is part of the current root SB (910). A BV value (941) indicates the location of a candidate reference block in an outer search area (931), which includes reconstructed content of previous root SBs of the current picture, but not the current root SB (910). The BV value (941) can indicate the location of a candidate reference block anywhere in the outer search area (931). Another BV value (942) indicates the location of a candidate reference block in an inner search area (932), which includes reconstructed parts of the current root SB (930). A candidate reference block can be totally outside the inner search area (932) or totally inside the inner search area (932), but a candidate reference block cannot be partly inside and partly outside the inner search area (932). Thus, a candidate reference block cannot cross the boundary line between the inner search area (932) and outer search area (931).

Figure 10:
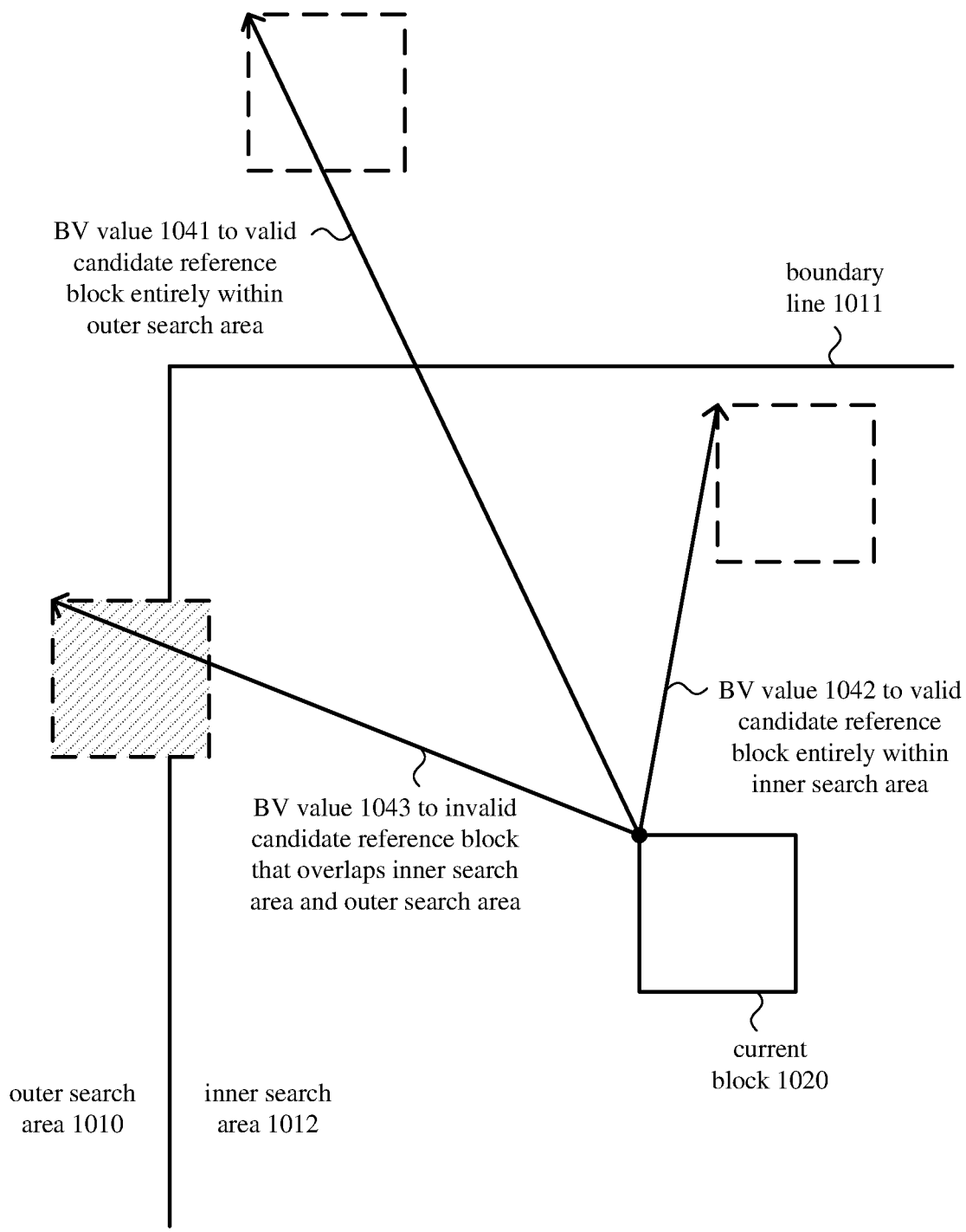

FIG. 10 further illustrates this constraint. In FIG. 10, a boundary line (1011) separates an outer search area (1010) and an inner search area (1012). Different BV values for a current block (1020) being encoded/decoded with intra BC prediction are shown. One BV value (1041) references a valid candidate reference block located entirely within the outer search area (1010). Another BV value (1042) references a valid candidate reference block located entirely within the inner search area (1012). The first and second BV values (1041, 1042) satisfy the constraint. A third BV value (1043), however, references an invalid candidate reference block that overlaps the inner search area (1012) and outer search area (1010). The invalid candidate reference block crosses the boundary line (1011). Thus, the third BV value (1043) fails the constraint.

In typical hardware-based implementations, reconstructed sample values inside the inner search area are buffered in on-chip memory, and reconstructed sample values inside the outer search area are buffered in off-chip memory. The constraint illustrated in FIGS. 9b and 10 is beneficial in terms of memory access efficiency for intra BC prediction operations. Reconstructed sample values of a reference block are located only in on-chip memory or only in off-chip memory, but do not straddle both on-chip memory and off-chip memory. At the same time, reference blocks within the inner search area can be close to the current block being encoded/decoded, which can improve compression efficiency compared to the constraint illustrated in FIG. 9a. Although reference blocks that overlap the inner search area and outer search area are not allowed, the resulting penalty on compression efficiency is usually small.

In the example (902) of FIG. 9b, the inner search area (932) is the current root SB (910). Alternatively, the inner search area (932) can have another size (e.g., the current root SB (910) and previous root SB to the left, if any). For other implementations, the inner search area (932) can be defined differently. For example, in extensions of the H.265 standard, the inner search area is the current CTU. Or, the inner search area is the current CTU and previous CTU to the left, if any. Alternatively, the inner search area can have a size and/or shape that does not align with root SB/CTU boundaries.

More generally, the boundary between the inner search area and outer search area can be pre-defined (e.g., one root unit, two root units). Or, the boundary can be signaled with a syntax element in a bitstream, allowing the inner search area to have a flexible size. For example, different complexity levels for decoding, associated with different sets of resources expected to be available for decoding, could have different sizes of inner search area.

In FIGS. 9b and 10, a boundary line cleanly separates the inner search area from the outer search area. In this case, there is no gap region between the inner search area and the outer search area. Alternatively, a boundary region with a width of one or more sample values can separate the inner search area and the outer search area.

In general, the inner search area is set for encoding/decoding of all units within a root unit (e.g., root SB, CTU). Even if the root unit is partitioned into smaller units for encoding/decoding, the inner search area does not shift in size or location for encoding/decoding of the respective smaller units within the root unit. This means that different parts of the inner search area may be available or not available for use in intra BC prediction, depending on the location of the current unit. As shown in FIG. 9b, for the current block (920), the inner search area (932) includes some not-yet-coded parts (912) of the current root SB (910), which are off limits for intra BC prediction of the current block (920). The encoder can apply availability checking rules, as described below, within the inner search area to determine whether a candidate reference block in the inner search area includes reconstructed sample values available for use in intra BC prediction.

When the inner search area is a root unit (e.g., root SB, CTU), there can be overlap between the reference block and root unit. In some cases, reconstructed sample values in the root unit may be used for prediction of sample values of a block within the root unit. Even so, there is no overlap between the reference block and current block being encoded/decoded.

The constraints described in this section can be enforced in conjunction with other constraints as described in the next section. For example, for a candidate reference block in an outer search area, availability rules can be checked for rows of root units, range constraints for BV values can be enforced, and/or constraints on locations of candidate reference blocks for parallel processing can be enforced. For a candidate reference block in an inner search area, availability rules can be checked within the inner search area. Range constraints on BV values and constraints on locations of candidate reference blocks for parallel processing may be checked, or may be inapplicable given the possible displacements within the inner search area.

E. Examples of Other Constraints on BV Values.

An encoder can enforce various other constraints on the location of a reference block when determining the BV value associated with a current unit of a picture. This section details examples of other constraints that an encoder can enforce for intra BC prediction. Some constraints can ensure that a reference block indicated by a BV value includes reconstructed sample values that will be available when the current block is encoded or decoded. Still other constraints help limit bit rate associated with signaling BV values or enable parallel encoding/decoding operations for intra BC prediction. Constraints enforced by an encoder on allowable BV values can alternatively be expressed in terms of bitstream conformance requirements for BV values in a codec format.

Suppose a current block of a current unit starts from position ($x_{curr\_block}$, $y_{curr\_block}$), relative to the top-left position of the current picture. The width and height of the current block (and reference block) are $w_{block}$ and $h_{block}$, respectively. The current block (and current unit) can be part of a root unit (e.g., 128×128 SB, 64×64 CTU). The root unit size is S. The block vector used in intra BC prediction for the current (luma) block of the current unit is ($BV_x$, $BV_y$).

1. Example Constraints on Range of BV Values.

To limit the bit rate cost associated with signaling of BV values, the range of BV values can be constrained. The range of BV values can be the same horizontally and vertically, or the range of BV values can be different horizontally and vertically. That is, $BV_{min\_x} \Leftarrow BV_x \Leftarrow BV_{max\_x}$, and $BV_{min\_y} \Leftarrow BV_y \Leftarrow BV_{max\_y}$, where $BV_{min\_x}$ and $BV_{max\_x}$ indicate the minimum value and maximum value, respectively, allowed for the horizontal component of a BV value, and $BV_{min\_y}$ and $BV_{max\_y}$ indicate the minimum value and maximum value, respectively, allowed for the vertical component of a BV value. For example, the range is [−1023, 1023] for the horizontal component of a BV value, and the range is [−1023, 124] for the vertical component of a BV value. Alternatively, the horizontal component and/or vertical component of a BV value can have other ranges.

2. Example Constraints for Tiles or Slices.

A reference block can be constrained to be within the same tile as the current block. In this case, intra BC prediction does not use sample values in other tiles. Or, when slice coding is used, a reference block can be constrained to be within the same slice as the current block. In this case, intra BC prediction does not use sample values in other slices.

For example, the encoder verifies that the position ($x_{curr\_block}$, $y_{curr\_block}$) and the position ($x_{curr\_block}+BV_x$, $y_{curr\_block}+BV_y$) are in the same slice, if applicable, and in the same tile, if applicable. That is, the encoder verifies that the top-left position of the current block and the top-left position of the reference block are in the same slice and in the same tile. If the two positions are in different slices or different tiles, the constraint is not satisfied. The encoder also verifies that the position ($x_{curr\_block}$, $y_{curr\_block}$) and the position ($x_{curr\_block}+BV_x+w_{block}-1$, $y_{curr\_block}+BV_y+h_{block}-1$) are in the same slice, if applicable, and same tile, if applicable. That is, the encoder verifies that the top-left position of the current block and the bottom-right position of the reference block are in the same slice and in the same tile. If the two positions are in different slices or different tiles, the constraint is not satisfied. All positions of the current block are in a single slice and single tile. If these constraints are satisfied, all positions of the reference block are also in that slice and tile.

If multiple slices are not used, the two positions that are checked are necessarily in the same slice, and the constraints for slices need not be checked, although the reference block is still constrained to be within the current picture. Similarly, if multiple tiles are not used, the two positions that are checked are necessarily in the same tile, and the constraints for tiles need not be checked, although the reference block is still constrained to be within the current picture.

3. Example Constraints Based on Availability of Reconstructed Sample Values.

For intra BC prediction, the encoder and decoder use reconstructed sample values in the current picture. Unreconstructed sample values might be present as parts of the current picture that have not been reconstructed yet. To avoid using unreconstructed sample values for intra BC prediction, the encoder can set constraints on allowable BV values such that only actual, previously reconstructed sample values in the current picture are used for intra BC prediction.

For example, the encoder can check whether $(y_{curr\_block}+BV_y+h_{block}-1)/S < y_{curr\_block}/S$. That is, the encoder calculates the root unit row that includes the bottom edge of the reference block: $(y_{curr\_block}+BV_y+h_{block}-1)/S$. The encoder also calculates the root unit row that includes the top edge of the current block: $y_{curr\_block}/S$. The encoder then checks whether the root unit row that includes the bottom edge of the reference block is above the root unit row that includes the top edge of the current block. If so, since root unit rows are reconstructed from top-to-bottom, the reference block is within a previous root unit row that has already been reconstructed, and the reference block necessarily includes previously reconstructed sample values, at least when WPP is not enabled.

On the other hand, when $(y_{curr\_block}+BV_y+h_{block}-1)/S = y_{curr\_block}/S$, the root unit row that includes the bottom edge of the reference block equals the root unit row that includes the top edge of the current block. This means the current block is in the same root unit row as at least a bottom part of the reference block. In this case, the encoder checks whether $(x_{curr\_block}+BV_x+w_{block}-1)/S < x_{curr\_block}/S$. That is, the encoder calculates (a) the root unit column that includes the right edge of the reference block $((x_{curr\_block}+BV_x+w_{block}-1)/S)$, and (b) the root unit column that includes the left edge of the current block ($x_{curr\_block}/S$). The encoder then checks whether the root unit column that includes the right edge of the reference block is left of the root unit column that includes the left edge of the current block. If so, since root units are reconstructed from left-to-right in a root unit row, the reference block is within a previous root unit column that has already been reconstructed, and the reference block necessarily includes previously reconstructed sample values.

On the other hand, when $(y_{curr\_block}+BV_y+h_{block}-1)/S = y_{curr\_block}/S$ and $(x_{curr\_block}+BV_x+w_{block}-1)/S = x_{curr\_block}/S$, the root unit row that includes the bottom edge of the reference block equals the root unit row that includes the top edge of the current block, and the root unit column that includes the right edge of the reference block equals the root unit column that includes the left edge of the current block. This means the current block is in the same root unit row and same root unit column as at least a bottom-right part of the reference block. In this case, the encoder checks whether the z-scan order of the position ($x_{curr\_block}+BV_x+w_{block}-1$, $y_{curr\_block}+BV_y+h_{block}-1$) is smaller than the z-scan order of the position ($x_{curr\_block}$, $y_{curr\_block}$). That is, the encoder checks whether the bottom-right position of the reference block is earlier in z-scan order than the top-left position of the current block. If so, the block that contains the bottom-right position of the reference block has been previously reconstructed, and hence so has the rest of the reference block. This condition applies if prediction from within a current root unit is allowed, e.g., when the current root unit defines an inner search area for BV estimation. The encoder can also check that the offset value satisfies at least one of the conditions $BV_x+w_{block} \leq 0$ and $BV_y+h_{block} \leq 0$, ensuring that the reference block does not overlap the current block.

Figure 11:
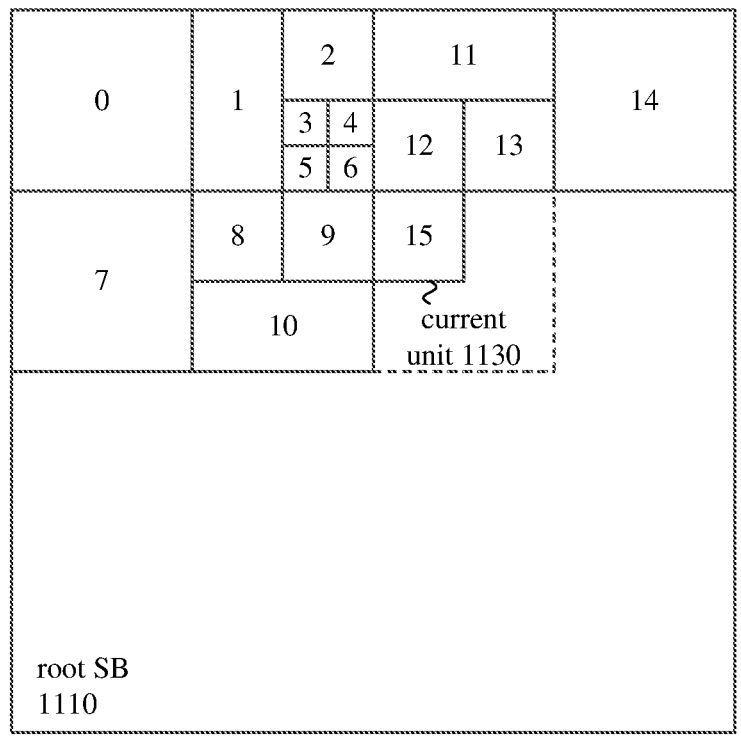

In general, the z-scan order for root units within a picture, and for partitioned units within a root unit, follows a sequentially specified ordering of units. FIG. 11 shows example z-scan order (1100) for a current unit (1130) and units that might include the bottom-right position of a reference block within a root SB (1110). Within a picture, the z-scan order proceeds root unit-to-root unit along a raster scan pattern (left-to-right in a root unit row, repeating in successive root unit rows from top-to-bottom). If a root unit is partitioned into smaller units, the z-scan order follows a raster scan pattern for the smaller units within the root unit, left-to-right for the top row then left-to-right for the bottom row. If a smaller unit is further partitioned, the z-scan order similarly follows a raster scan pattern within that partitioned smaller unit. In this way, z-scan order recursively defines an order of traversal within a root unit, which may be recursively partitioned.

4. Example Constraints for Wavefront Parallel Processing.

In some example implementations, when wavefront parallel processing ("WPP") is not enabled, candidate reference blocks can be anywhere within the reconstructed content of the current picture, subject to the other constraints described above. Root units of a picture are generally coded in a raster scan pattern from left-to-right, then from top-to-bottom, with additional traversal rules applying for root units that are partitioned into smaller units.

When WPP is enabled, additional constraints on locations of candidate reference blocks apply. The constraints allow a decoder to decode different root unit rows in parallel, with decoding of root unit rows starting one after another after a delay period such as two root units per root unit row. Intra BC prediction is allowed only from a reference block within the same root unit row as the current root unit being encoded/decoded, or from a reference block within a previous root unit row so long as the reference block is not "too far to the right" of the current root unit being encoded/decoded. What qualifies as "too far to the right" depends on how far the reference block is above the current root unit.

The encoder can check whether $(y_{curr\_block}+BV_y+h_{block}-1)/S \Leftarrow y_{curr\_block}/S$. That is, the encoder calculates the root unit row that includes the bottom edge of the reference block: $(y_{curr\_block}+BV_y+h_{block}-1)/S$. The encoder also calculates the root unit row that includes the top edge of the current block: $y_{curr\_block}/S$. The encoder then checks whether the root unit row that includes the bottom edge of the reference block is less than or equal to the root unit row that includes the top edge of the current block. If so, the reference block and the current block are within the same root unit row, or the reference block is in a previous unit row.

If the reference block is in a previous unit row, the encoder can check whether $(x_{curr\_block}+BV_x+w_{block}-1)/S < (x_{curr\_block}/S)+thr_{vert}$. That is, the encoder calculates the root unit column that includes the right edge of the reference block: $(x_{curr\_block}+BV_x+w_{block}-1)/S$. The encoder also calculates the root unit column that includes the left edge of the current block: $(x_{curr\_block}/S)$. Finally, the encoder calculates a threshold $thr_{vert}$ that depends on a vertical displacement value for the BV value associated with the current unit. For example, the threshold $thr_{vert}=2\times((y_{curr\_block}/S)-(y_{curr\_block}+BV_y+h_{block}-1)/S))$. In this case, the threshold increases as vertical distance away from the current root unit increases. In effect, a horizontal displacement of two root units to the right is allowed for each root unit row above the current root unit. If the start of decoding of different root unit rows is staggered by a different amount (e.g., 1 root unit, 3 root units), the threshold $thr_{vert}$ can be adjusted accordingly (e.g., the scaling factor 2 becomes 1 or 3, respectively). This allows the reference block to be within a previous root unit row so long as the reference block is within a leading edge of reconstructed content for WPP, including some root units above and to the right of the current root unit.

Figure 12:
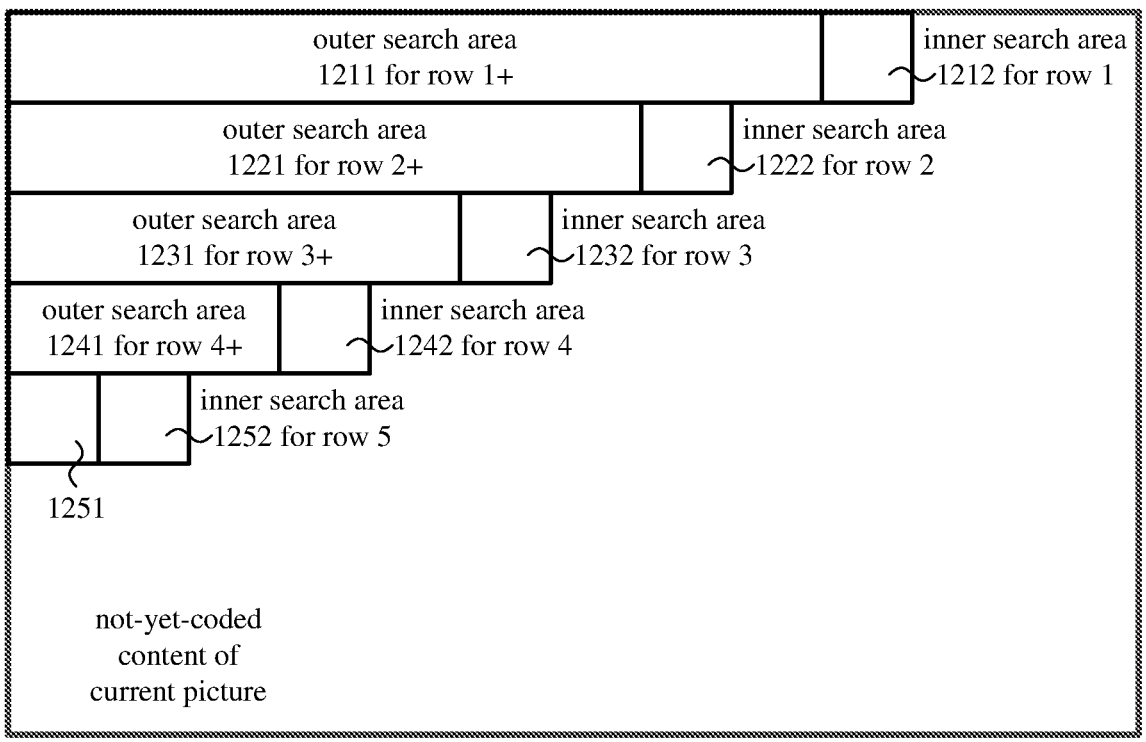

FIG. 12 shows an example (1200) of search areas for intra BC prediction in parallel encoding or decoding. The search areas are consistent with constraints on locations of candidate reference blocks with WPP enabled, for decoding staggered by two root units per row, and consistent with a constraint that allows candidate reference blocks in an outer search area or inner search area but not overlapping both. For the first root unit row, the outer search area (1211) includes previously reconstructed root units in the first root unit row, and the inner search area (1212) includes the current root unit being encoded/decoded in the first root unit row. For the second root unit row, the outer search area (1221) includes previously reconstructed root units in the second root unit row as well as the outer search area (1211) of the first root unit row. The inner search area (1222) includes the current root unit being encoded/decoded in the second root unit row. Similarly, for the third root unit row, the outer search area (1231) includes previously reconstructed root units in the third root unit row as well as the outer search areas (1211, 1221) of the previous root unit rows. The inner search area (1232) includes the current root unit being encoded/decoded in the third root unit row. Outer search areas (1241, 1251) and inner search areas (1242, 1252) are similarly defined for the fourth and fifth root unit rows.

Alternatively, for root unit rows whose decoding is staggered by one root unit, the encoder can verify that $(x_{curr\_block}+BV_x+w_{block}-1)/S-x_{curr\_block}/S < y_{curr\_block}/S-(y_{curr\_block}+BV_y+h_{block}-1)/S$. That is, the encoder calculates the difference between the root unit column that includes the right edge of the reference block and the root unit column that includes the left edge of the current block: $(x_{curr\_block}+BV_x+w_{block}-1)/S-x_{curr\_block}/S$. The encoder also calculates the difference between the root unit row that includes the top edge of the current block and the root unit row that includes the bottom edge of the reference block: $y_{cb}/S-(y_{cb}+BV_y+h_{block}-1)/S$. The encoder verifies that the first difference (between root unit columns) is less than the second difference (between root unit rows). More generally, a horizontal displacement value from a reference block to the current block is constrained to be less than or equal to a vertical displacement value from the current block to the reference block.

F. Example Techniques for Encoding with Constraints on Locations of Reference Blocks for Intra BC Prediction Mode.

Figure 13:
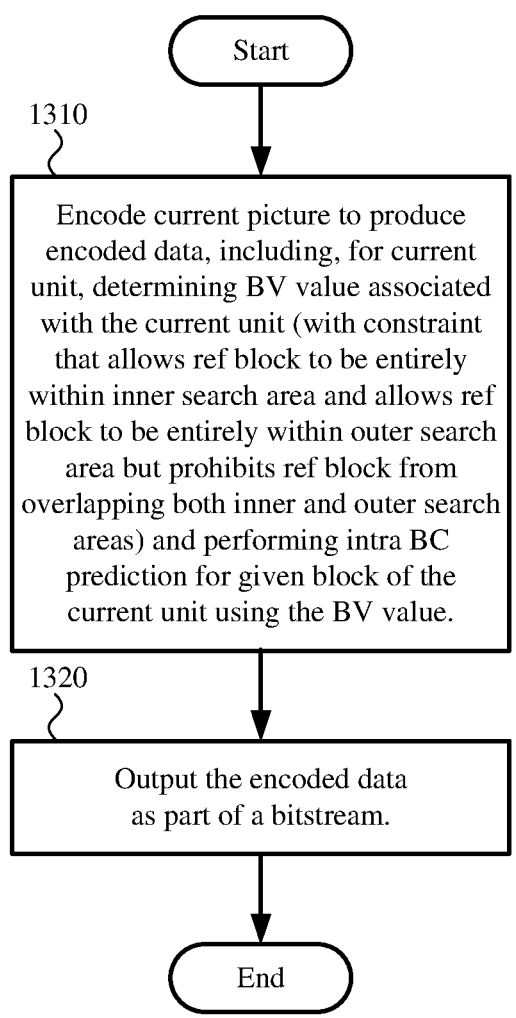
FIG. 13 is a flowchart illustrating a generalized technique for encoding with constraints on locations of reference blocks for intra BC prediction mode.

FIG. 13 shows a generalized technique (1300) for encoding with constraints on locations of reference blocks for intra BC prediction mode. A video encoder such as one described with reference to FIG. 3 or FIGS. 4a-4b, or other video encoder or image encoder, can perform the technique (1300).

At a high level, the encoder encodes (1310) a current picture to produce encoded data and outputs (1320) the encoded data as part of a bitstream. During the encoding (1310), for a current unit (e.g., superblock, macroblock, prediction unit) of the current picture, the encoder determines a BV value associated with the current unit. The BV value indicates a displacement from a given block of the current unit to a reference block in the current picture. The encoder performs intra BC prediction for the given block of the current unit using the BV value associated with the current unit.

When determining the BV value associated with the current unit, the encoder enforces a constraint that allows the reference block to be entirely within an inner search area of the current picture and allows the reference block to be entirely within an outer search area of the current picture but prohibits the reference block from overlapping both the inner search area and the outer search area. For example, the constraint is one of the constraints described in section V.D. A boundary line or boundary region can separate the inner search area from the outer search area. To enforce this constraint, the encoder can check that the reference block does not cross the boundary line or boundary region. Or, to enforce this constraint, the encoder can check that the reference block is completely contained within the inner search area (e.g., at or inside a perimeter of the inner search area) or the outer search area (e.g., at or inside a perimeter of the outer search area but outside the inner search area).

Enforcing this constraint can make intra BC prediction more efficient for hardware implementations in which memory includes on-chip memory and off-chip memory. In some example implementations, a first buffer (which is part of the on-chip memory) stores sample values of the inner search area, and a second buffer (which is part of the off-chip memory) stores sample values of the outer search area. After reconstruction of all of the sample values of the inner search area, the encoder can transfer the sample values of the inner search area from the first buffer to the second buffer.

The encoder can also enforce one or more other constraints when determining the BV value associated with the current unit. For example, the encoder can enforce a constraint that the BV value associated with the current unit be within a range of permissible BV values. Sections V.B and V.E describe examples of range constraints for BV values. Or, as another example, with a test for z-scan order, the encoder can enforce a constraint that the reference block include sample values that have been reconstructed. Section V.E describes examples of constraints that consider availability with a raster scan pattern or z-scan pattern. Or, as another example, the encoder can enforce a constraint that the reference block not violate a rule on dependencies between different sections of the current picture for parallel encoding or decoding. Section V.E describes examples of constraints for wavefront parallel processing. Or, as another example, the encoder can enforce a constraint that the given block and the reference block be in the same tile, if applicable, and in the same slice, if applicable. Section V.E describes examples of constraints for tile boundaries and slice boundaries. Or, as another example, the encoder can enforce some other constraint.

Typically, the given block of the current unit is a primary component block. The primary component block can include luma sample values. When the current unit also includes secondary component blocks with sample values (e.g., chroma sample values) that have been sub-sampled relative to the sample values of the primary component block, the encoder can derive a BV value for the secondary component blocks of the current unit based at least in part on the BV value associated with the current unit, then perform intra BC prediction for the secondary component blocks using the derived BV value. For example, if the current picture is in a YUV 4:2:0 format, the BV value can be sub-sampled by a factor of two horizontally and vertically.

To determine the BV value associated with the current unit, the encoder can use any of the BV estimation strategies described in section V.C. For example, the encoder uses hash-based block matching and/or block matching according to a search pattern to determine the BV value associated with the current unit. Alternatively, the encoder can use another BV estimation strategy.

The BV value associated with the current unit has an integer-sample value resolution. That is, the horizontal component of the BV value is an integer number of sample values, and the vertical component of the BV value is an integer number of sample values. Alternatively, the BV value associated with the current unit can have a fractional-sample value resolution. In this case, an interpolation filter is applied to reconstructed sample values at integer sample value locations to determine predicted sample values. The interpolation filter has a filter support region, which includes sample values used in interpolation of sample values of the reference block. The filter support region includes some sample values just outside the reference block. When determining the BV value associated with the current unit, the encoder can enforce a constraint that allows the filter support region around the reference block to be entirely within the inner search area and allows the filter support region to be entirely within the outer search area but prohibits the filter support region from overlapping both the inner search area and the outer search area.

The current picture includes multiple root units. Each of the root units has a maximum unit size and can be partitioned into smaller units. For example, for extensions of the AV1 format, each of the root units is a 128×128 SB. Or, for extensions of the H.265 format, each of the root units is a 64×64 CTU. When the encoder determines the BV value associated with the current unit, the current unit can be one of the multiple root units. Or, a given root unit can be partitioned into smaller units, and the current unit is one of the smaller units. Thus, for example, the current unit can have a size of 256×256, 256×128, 128×256, 128×128, 128×64, 64×128, 64×64, 64×32, 32×64, 32×32, 32×16, 16×32, 16×16, 16×8, 8×16, 8×8, 8×4, 4×8, or 4×4 sample values.

In some example implementations, the inner search area is a root unit (e.g., 128×128 SB). That is, the inner search area has a size equal to size of the root unit. When a root unit is partitioned into smaller units, the inner search area for the smaller units is still the root unit. That is, the inner search area is unchanged for any and all of the smaller units of the root unit.

Alternatively, the inner search can be multiple root units (e.g., current 128×128 SB and previous 128×128 SB to the left). Thus, for example, the inner search area can have a height equal to the height of a root unit and a width double the width of a unit. The inner search area is unchanged for smaller units of a root unit.

The size of the inner search area can be pre-defined. For example, the size of the inner search area can be defined as a single root unit or two root units. Or, the size of the inner search area can be indicated by a syntax element in the bitstream. The syntax element in the bitstream can indicate one of multiple possible sizes for the inner search area, or the syntax element can expressly specify the size of the inner search area. For example, the syntax element is signaled as part of level information that specifies resource requirements for a decoder.

Figure 14:
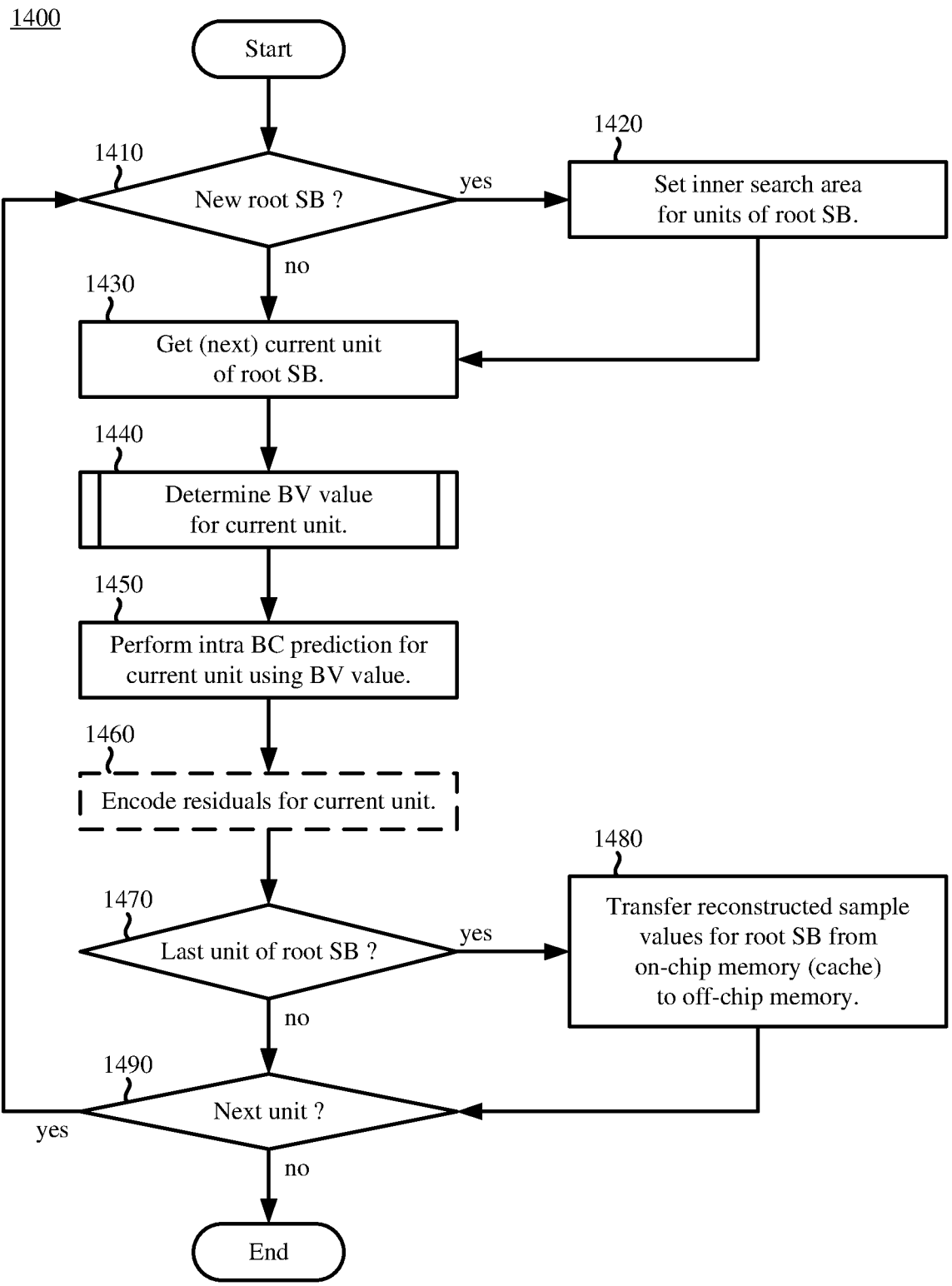
FIG. 14 is a flowchart illustrating an example technique for encoding units of superblocks of a current picture with intra BC prediction.

FIG. 14 shows an example technique (1400) for encoding units of SBs of a current picture with intra BC prediction. A video encoder such as one described with reference to FIG.

3 or FIGS. 4a-4b, or other video encoder or image encoder, can perform the technique (1400).

The encoder checks (1410) whether a new root SB of the current picture has been reached. If so, the encoder sets (1420) a new inner search area for units of the new root SB. For example, the inner search area is the 128×128 region for the root SB.

Figure 15A:
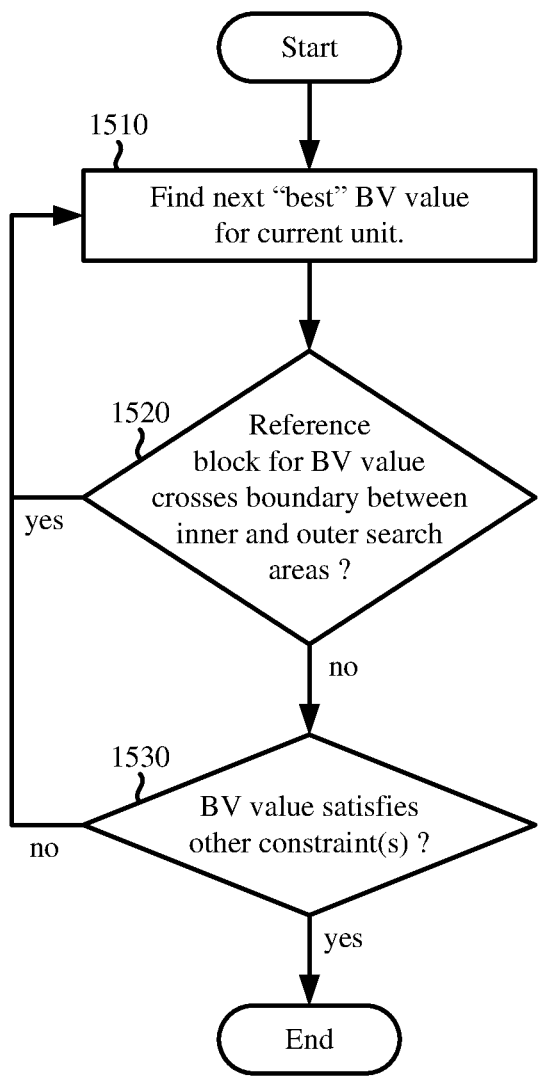
FIGS. 15a and 15b are flowcharts illustrating example techniques for determining a BV value associated with a current unit, subject to constraints on location of a reference block.
Figure 15B:
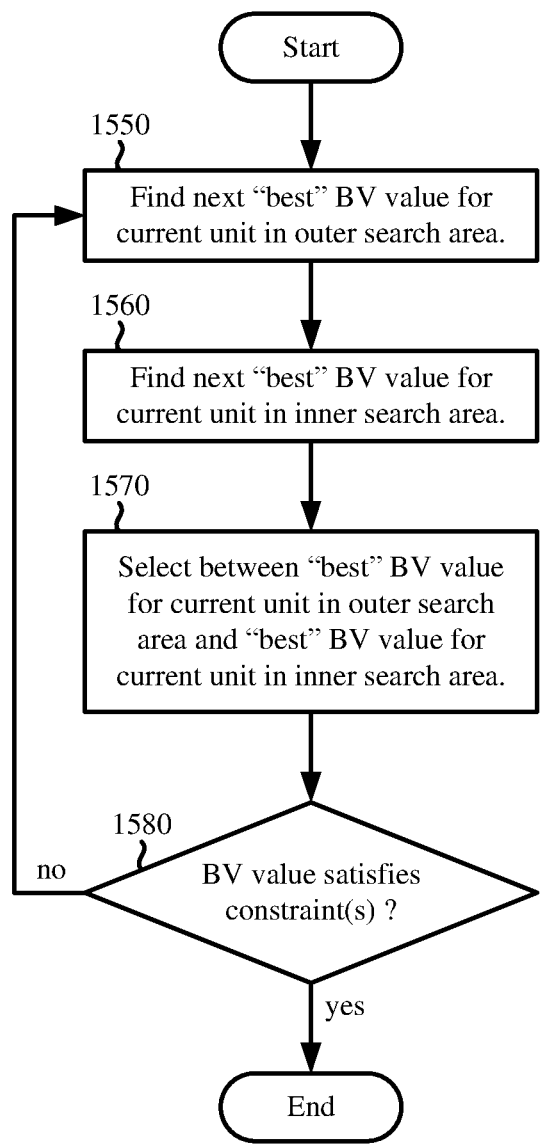

The encoder gets (1430) the current unit of the root SB, which is the next unit to be encoded in the root SB. The encoder determines (1440) a BV value associated with the current unit, subject to one or more constraints on the BV value. The constraint(s) include a constraint that allows the reference block to be entirely within an inner search area of the current picture and allows the reference block to be entirely within an outer search area of the current picture but prohibits the reference block from overlapping both the inner search area and the outer search area. For example, the encoder determines (1440) the BV value associated with the current unit as shown in FIGS. 15a and 15b, which show example techniques (1501, 1502) for determining the BV value. Alternatively, the encoder determines (1440) the BV value associated with the current unit in some other way.

With reference to FIG. 15a, the encoder finds (1510) the next "best" BV value associated with the current unit using BV estimation. Section V.C describes examples of approaches for BV estimation. The criteria for what constitutes a "best" BV value can account for sample value differences (error) between the corresponding reference block and current block as well as bit rate associated with signaling the BV value, before enforcing constraints on the BV value. The encoder then checks (1520) whether the reference block for the BV value crosses a boundary between the inner search area and outer search area of the current picture. If the reference block crosses the boundary, the current "best" BV value is discarded, and the encoder finds (1510) the next "best" BV value associated with the current unit. Otherwise (the BV value satisfies the boundary constraint), the encoder checks (1530) one or more other constraints on the BV value. For example, the encoder checks one or more of the other constraints described in section V.E. If the BV value satisfies the other constraint(s), the BV value is used for the current unit. Otherwise (the BV value fails at least one of the constraint(s)), the current "best" BV value is discarded, and the encoder finds (1510) the next "best" BV value associated with the current unit.

With reference to FIG. 15b, the encoder finds (1550) the next "best" BV value associated with the current unit in the outer search area using BV estimation, and also finds (1560) the next "best" BV value associated with the current unit in the inner search area using BV estimation. Neither of the "best" BV values can possibly cross a boundary between the inner search area and outer search area. Section V.C describes examples of approaches for BV estimation. The encoder selects (1570) between the "best" BV value associated with the current unit in the outer search area and the "best" BV value associated with the current unit in the inner search area. The criteria for what constitutes a "better" or "best" BV value can account for sample value differences (error) between the corresponding reference block and current block as well as bit rate associated with signaling the BV value, before enforcing constraints on the BV value. The encoder checks (1580) one or more constraints on the BV value. For example, the encoder checks one or more of the other constraints described in section V.E. If the BV value satisfies the constraint(s), the BV value is used for the current unit. Otherwise (the BV value fails at least one of the constraint(s)), the selected "best" BV value is discarded, and the encoder finds (1550, 1560) the next "best" BV values associated with the current unit in the outer search area and inner search area, respectively.

Returning to FIG. 14, the encoder performs (1450) intra BC prediction for the current unit using the BV value and optionally encodes (1460) residual values for the current unit. The encoder also reconstructs sample values for the current unit in on-chip memory.

The encoder checks (1470) if the last unit of the root SB has been encoded. If so, the encoder transfers (1480) reconstructed sample values for the root SB from on-chip memory to off-chip memory.

The encoder checks (1490) whether to continue for the next unit of the current picture. If so, the encoder continues by checking (1410) whether a new root SB has been reached. The encoder can repeat the technique (1400) on a picture-by-picture basis.

G. Example Techniques for Decoding with Constraints on Locations of Reference Blocks for Intra BC Prediction Mode.

Figure 16:
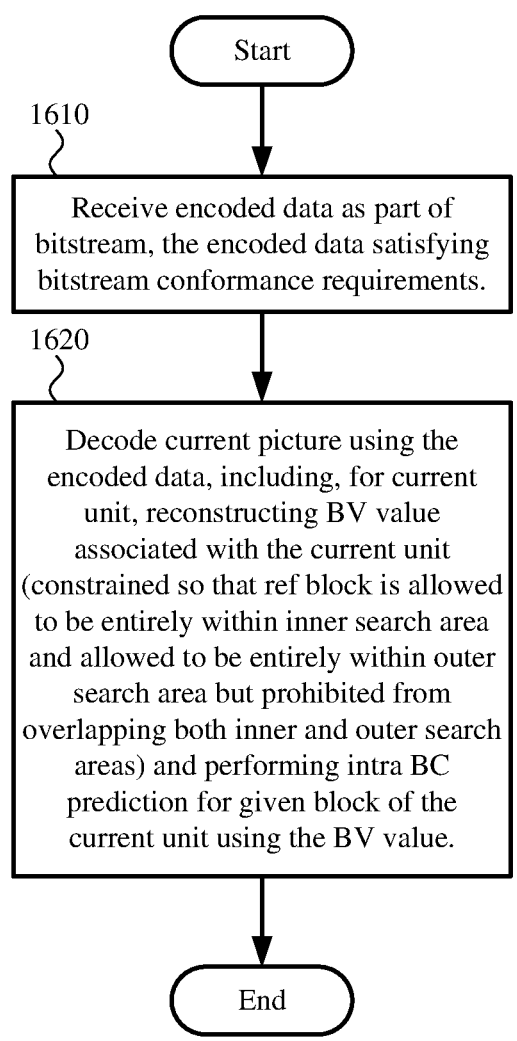
FIG. 16 is a flowchart illustrating a generalized technique for decoding with constraints on locations of reference blocks for intra BC prediction mode.

FIG. 16 shows a generalized technique (1600) for decoding with constraints on locations of reference blocks for intra BC prediction mode. A decoder such as one described with reference to FIG. 5 or FIG. 6, or other video decoder or image decoder, can perform the technique (1600).

At a high level, the decoder receives (1610) encoded data as part of a bitstream. The encoded data satisfies various bitstream conformance requirements. The decoder decodes (1620) a current picture using the encoded data. During the decoding (1620), for a current unit (e.g., superblock, macroblock, prediction unit) of the current picture, the decoder reconstructs a BV value associated with the current unit. The BV value indicates a displacement from a given block of the current unit to a reference block in the current picture. The decoder performs intra BC prediction for the given block of the current unit using the BV value associated with the current unit.

According to one of the bitstream conformance requirements, the BV value is constrained so that the reference block is allowed to be entirely within an inner search area of the current picture and the reference block is allowed to be entirely within an outer search area of the current picture, but the reference block is prohibited from overlapping both the inner search area and the outer search area. Enforcement of this constraint can make intra BC prediction more efficient for hardware implementations in which memory includes on-chip memory and off-chip memory. In some example implementations, a first buffer (which is part of the on-chip memory) stores sample values of the inner search area, and a second buffer (which is part of the off-chip memory) stores sample values of the outer search area. After reconstruction of all of the sample values of the inner search area, the decoder can transfer the sample values of the inner search area from the first buffer to the second buffer.

According to one or more other bitstream conformance requirements, the BV value associated with the current unit can be constrained in various other ways. For example, the BV value can be constrained so that it is within a range of permissible BV values. Sections V.B and V.E describe examples of range constraints for BV values. Or, as another example, the BV value can be constrained so that, according to a test for z-scan order, the reference block includes sample values that have been reconstructed. Section V.E describes examples of constraints that consider availability with a raster scan pattern or z-scan pattern. Or, as another example, the BV value can be constrained so that the reference block does not violate a rule on dependencies between different sections of the current picture for parallel decoding. Section V.E describes examples of constraints for wavefront parallel processing. Or, as another example, the BV value can be constrained so that the given block and the reference block are in the same tile, if applicable, and in the same slice, if applicable. Section V.E describes examples of constraints for tile boundaries and slice boundaries. Or, as another example, the BV value can be constrained in some other way.

Typically, the given block of the current unit is a primary component block. The primary component block can include luma sample values. When the current unit also includes secondary component blocks with sample values (e.g., chroma sample values) that have been sub-sampled relative to the sample values of the primary component block, the decoder can derive a BV value for the secondary component blocks of the current unit based at least in part on the BV value associated with the current unit, then perform intra BC prediction for the secondary component blocks using the derived BV value. For example, if the current picture is in a YUV 4:2:0 format, the BV value can be sub-sampled by a factor of two horizontally and vertically.

The BV value associated with the current unit has an integer-sample value resolution. That is, the horizontal component of the BV value is an integer number of sample values, and the vertical component of the BV value is an integer number of sample values. Alternatively, the BV value associated with the current unit can have a fractional-sample value resolution. In this case, the BV value associated with the current unit can be constrained so that a filter support region around a reference block is entirely within the inner search area or entirely within the outer search area, but the filter support region is prohibited from overlapping both the inner search area and the outer search area.

The current picture includes multiple root units. Each of the root units has a maximum unit size and can be partitioned into smaller units. For example, for extensions of the AV1 format, each of the root units is a 128×128 SB. Or, for extensions of the H.265 format, each of the root units is a 64×64 CTU. When the decoder reconstructs the BV value associated with the current unit, the current unit can be one of the multiple root units. Or, a given root unit can be partitioned into smaller units, and the current unit is one of the smaller units. Thus, for example, the current unit can have a size of 256×256, 256×128, 128×256, 128×128, 128×64, 64×128, 64×64, 64×32, 32×64, 32×32, 32×16, 16×32, 16×16, 16×8, 8×16, 8×8, 8×4, 4×8, or 4×4 sample values.

In some example implementations, the inner search area is a root unit (e.g., 128×128 SB). That is, the inner search area has a size equal to size of the root unit. When a root unit is partitioned into smaller units, the inner search area for the smaller units is still the root unit. That is, the inner search area is unchanged for any and all of the smaller units of the root unit.

Alternatively, the inner search can be multiple root units (e.g., current 128×128 SB and previous 128×128 SB to the left). Thus, for example, the inner search area can have a height equal to the height of a root unit and a width double the width of a root unit. The inner search area is unchanged for smaller units of a root unit.

The size of the inner search area can be pre-defined. For example, the size of the inner search area can be defined as a single root unit or two root units. Or, the size of the inner search area can be indicated by a syntax element in the bitstream. The syntax element in the bitstream can indicate one of multiple possible sizes for the inner search area, or the syntax element can expressly specify the size of the inner search area. For example, the syntax element is signaled as part of level information that specifies resource requirements for a decoder.

H. Alternatives and Variations.

In many of the examples described herein, an encoder enforces constraints on allowable BV values. The constraints can alternatively be considered constraints on values of syntax elements in a bitstream or constraints on BV values when reconstructed during decoding, where the encoder still selects the BV values. That is, the constraints can be expressed as bitstream conformance requirements for BV values in encoded data in a bitstream.

In many of the examples described herein, intra BC prediction and motion compensation are implemented in separate components or processes, and BV estimation and motion estimation are implemented in separate components or processes. Alternatively, intra BC prediction can be implemented as a special case of motion compensation, and BV estimation can be implemented as a special case of motion estimation, for which the current picture is used as a reference picture. In such implementations, a BV value can be signaled as an MV value but used for intra BC prediction (within the current picture) rather than inter-picture prediction. As the term is used herein, "intra BC prediction" indicates prediction within a current picture, whether that prediction is provided using an intra-picture prediction module, a motion compensation module, or some other module. Similarly, a BV value can be represented using an MV value or using a distinct type of parameter or syntax element, and BV estimation can be provided using an intra-picture estimation module, motion estimation module or some other module.

For a BV value associated with a unit, intra BC prediction operations can be applied at the level of a given block that has the same spatial resolution as the unit. In this case, a reference block is constrained to not overlap the given block. Alternatively, intra BC prediction operations can be applied for smaller blocks within the unit. For example, for a first smaller block within the unit, the reference block includes positions outside the unit. For a second smaller block within the unit, however, the reference block used in intra BC prediction operations can include positions in the previously reconstructed first smaller block. In this way, since reconstruction rules apply the BV value for intra BC prediction of smaller blocks, the BV value can reference positions in the same unit being encoded/decoded, and the reference block may overlap the unit. Allowing intra BC prediction operations to be applied for smaller blocks within a unit facilitates use of BV values with relatively small magnitudes.

In many of the examples described herein, a reference block for intra BC prediction is entirely within a current picture (or entirely within a tile, if tile constraints are used; or entirely within a slice, if slice constraints are used). Alternatively, a reference block for intra BC prediction can be at least partially outside the current picture (or tile, or slice). In this case, sample values can be padded away from the boundary of the current picture (or tile, or slice) to provide reconstructed sample values for the reference block. Or, default sample values can be used to provide reconstructed sample values for the reference block that are outside the boundary of the current picture (or tile, or slice).

In many of the examples described herein, the shape of a current block and reference block are rectilinear (e.g., square, rectangle)—the current block is a current rectangle, the reference block is a reference rectangle, and the intra BC prediction is intra rectangle copy prediction for the current rectangle and the reference rectangle. Alternatively, the shape of the current block and reference block can be a line—the current block is a current line, the reference block is a reference line, and the intra BC prediction is intra line copy prediction for the current line and the reference line. Determining the BV value associated with the current unit includes setting an offset value from the current line to the reference line, which includes previously reconstructed sample values that are scanned in a line scanning direction. Or, as another alternative, the shape of the current block and reference block can be a string in a rectangle—the current block is a current string, the reference block is a reference string, and the intra BC prediction is intra string copy prediction for the current string and the reference string. Determining the BV value associated with the current unit includes: (a) identifying a rectangle that includes the current string by determining a rectangle that includes a start position of the current string, an end position of the current string, and any positions between the start position and the end position of the current string in a string scanning order; (b) setting an offset value, applied to the rectangle that includes the current string, to a rectangle that includes the reference string, which includes previously reconstructed sample values that are scanned in the string scanning order; and (c) setting a length value that indicates length for each of the current string and the reference string.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A computer system comprising one or more processing cores and memory, wherein the computer system is configured to implement a video encoder or image encoder that performs operations comprising:
    encoding a current picture to produce encoded data, including, for a current unit of the current picture:
        determining a block vector ("BV") value associated with the current unit, the BV value indicating a displacement from a given block of the current unit to a reference block in the current picture, wherein the determining the BV value includes enforcing a constraint that allows the reference block to be entirely within an inner search area of the current picture and allows the reference block to be entirely within an outer search area of the current picture but prohibits the reference block from overlapping both the inner search area and the outer search area, the inner search area covering at least part of a given area that includes the current unit, the inner search area not overlapping the outer search area, and the outer search area covering none of the given area, and wherein the determining the BV value associated with the current unit further includes:
            enforcing a constraint that the BV value associated with the current unit be within a range of permissible BV values;
            with a test for z-scan order, enforcing a constraint that the reference block include sample values that have been reconstructed;
            enforcing a constraint that the reference block not violate a rule on dependencies between different sections of the current picture for parallel encoding or decoding; and/or
            enforcing a constraint that the given block and the reference block be in the same tile, if applicable, and in the same slice, if applicable; and
        performing intra block copy ("BC") prediction for the given block of the current unit using the BV value associated with the current unit; and
    outputting the encoded data as part of a bitstream.

2. The computer system of claim 1, wherein the current unit is a superblock, a macroblock, or a prediction unit, wherein the given block of the current unit is a primary component block, wherein the current unit also includes secondary component blocks, and wherein the encoding further includes, for the current unit:
    deriving a BV value for the secondary component blocks of the current unit based at least in part on the BV value associated with the current unit; and
    performing intra BC prediction for the secondary component blocks using the derived BV value.

3. The computer system of claim 2, wherein the primary component block includes luma sample values and the secondary component blocks include chroma sample values that have been sub-sampled relative to the luma sample values.

4. The computer system of claim 1, wherein the determining the BV value associated with the current unit uses hash-based block matching and/or block matching according to a search pattern.

5. The computer system of claim 1, wherein a boundary line or boundary region separates the inner search area from the outer search area, and wherein the enforcing the constraint that prohibits the reference block from overlapping both the inner search area and the outer search area includes:
    checking that the reference block does not cross the boundary line or boundary region; or
    checking that the reference block is completely contained within the inner search area or within the outer search area.

6. The computer system of claim 1, wherein the current picture includes multiple root units, wherein each of the multiple root units has a maximum unit size and can be partitioned into smaller units, and wherein a given root unit of the multiple root units is the given area that includes the current unit, the inner search area being unchanged for all of the units of the given root unit.

7. The computer system of claim 6, wherein the inner search area has a size equal to size of the given root unit.

8. The computer system of claim 1, wherein the inner search area has a size that is:
    pre-defined; or
    indicated by a syntax element in the bitstream.

9. The computer system of claim 1, wherein a first buffer stores sample values of the inner search area, wherein a second buffer stores sample values of the outer search area, and wherein the encoding further includes:
    after reconstruction of all of the sample values of the inner search area, transferring the sample values of the inner search area from the first buffer to the second buffer.

10. The computer system of claim 9, wherein the memory of the computer system includes on-chip memory and off-chip memory, wherein the first buffer is part of the on-chip memory, and wherein the second buffer is part of the off-chip memory.

11. In a computer system comprising one or more processing cores and memory, a method of video decoding or image decoding, the method comprising:
receiving encoded data as part of a bitstream, wherein the encoded data satisfies bitstream conformance requirements; and
decoding a current picture using the encoded data, including, for a current unit of the current picture:
reconstructing a block vector ("BV") value associated with the current unit, the BV value indicating a displacement from a given block of the current unit to a reference block in the current picture, wherein, according to one of the bitstream conformance requirements, the BV value is constrained so that the reference block is allowed to be entirely within an inner search area of the current picture and the reference block is allowed to be entirely within an outer search area of the current picture but the reference block is prohibited from overlapping both the inner search area and the outer search area, the inner search area covering at least part of a given area that includes the current unit, the inner search area not overlapping the outer search area, and the outer search area covering none of the given area, and wherein, according to the bitstream conformance requirements, the BV value associated with the current unit is further constrained so that:
the BV value associated with the current unit is within a range of permissible BV values;
according to a test for z-scan order, the reference block includes sample values that have been reconstructed;
the reference block does not violate a rule on dependencies between different sections of the current picture for parallel decoding; and/or
the given block and the reference block are in the same tile, if applicable, and in the same slice, if applicable; and
performing intra block copy ("BC") prediction for the given block of the current unit using the BV value associated with the current unit.

12. The method of claim 11, wherein the current unit is a superblock, a macroblock, or a prediction unit, wherein the given block of the current unit is a primary component block, wherein the current unit also includes secondary component blocks, and wherein the decoding further includes, for the current unit:
deriving a BV value for the secondary component blocks of the current unit based at least in part on the BV value associated with the current unit; and
performing intra BC prediction for the secondary component blocks using the derived BV value.

13. The method of claim 11, wherein the BV value associated with the current unit has integer-sample value resolution, and wherein the current unit has a size of 256×256, 256×128, 128×256, 128×128, 128×64, 64×128, 64×64, 64×32, 32×64, 32×32, 32×16, 16×32, 16×16, 16×8, 8×16, 8×8, 8×4, 4×8, or 4×4 sample values.

14. The method of claim 11, wherein the current picture includes multiple root units, wherein each of the multiple root units has a maximum unit size and can be partitioned into smaller units, and wherein a given root unit of the multiple root units is the given area that includes the current unit, the inner search area being unchanged for all of the units of the given root unit.

15. The method of claim 11, wherein the inner search area has a size that is:
pre-defined; or
indicated by a syntax element in the bitstream.

16. The method of claim 11, wherein a first buffer stores sample values of the inner search area, wherein a second buffer stores sample values of the outer search area, and wherein the decoding further includes:
after reconstruction of all of the sample values of the inner search area, transferring the sample values of the inner search area from the first buffer to the second buffer.

17. The method of claim 16, wherein the memory of the computer system includes on-chip memory and off-chip memory, wherein the first buffer is part of the on-chip memory, and wherein the second buffer is part of the off-chip memory.

18. One or more computer-readable media storing computer-executable instructions for causing a computer system, when programmed thereby, to perform operations comprising:
receiving encoded data as part of a bitstream, wherein the encoded data satisfies bitstream conformance requirements; and
decoding a current picture using the encoded data, including, for a current unit of the current picture:
reconstructing a block vector ("BV") value associated with the current unit, the BV value indicating a displacement from a given block of the current unit to a reference block in the current picture, wherein, according to one of the bitstream conformance requirements, the BV value is constrained so that the reference block is allowed to be entirely within an inner search area of the current picture and the reference block is allowed to be entirely within an outer search area of the current picture but the reference block is prohibited from overlapping both the inner search area and the outer search area, the inner search area covering at least part of a given area that includes the current unit, the inner search area not overlapping the outer search area, and the outer search area covering none of the given area, and wherein, according to the bitstream conformance requirements, the BV value associated with the current unit is further constrained so that:
the BV value associated with the current unit is within a range of permissible BV values;
according to a test for z-scan order, the reference block includes sample values that have been reconstructed;
the reference block does not violate a rule on dependencies between different sections of the current picture for parallel decoding; and/or
the given block and the reference block are in the same tile, if applicable, and in the same slice, if applicable; and
performing intra block copy ("BC") prediction for the given block of the current unit using the BV value associated with the current unit.

19. The one or more computer-readable media of claim 18, wherein the current unit is a superblock, a macroblock, or a prediction unit, wherein the given block of the current unit is a primary component block, wherein the current unit also includes secondary component blocks, and wherein the decoding further includes, for the current unit:
deriving a BV value for the secondary component blocks of the current unit based at least in part on the BV value associated with the current unit; and
performing intra BC prediction for the secondary component blocks using the derived BV value.

20. The one or more computer-readable media storing of claim 18, wherein a first buffer stores sample values of the inner search area, wherein a second buffer stores sample values of the outer search area, and wherein the decoding further includes:

after reconstruction of all of the sample values of the inner search area, transferring the sample values of the inner search area from the first buffer to the second buffer.

\* \* \* \* \*